United States Patent [19]
Lewis

[11] Patent Number: 5,752,322
[45] Date of Patent: May 19, 1998

[54] GIMBALLED OUROBOROS COMPASS DEVICE WITH DIGITAL LOGIC

[76] Inventor: W. Stan Lewis, 709 Mar Vista Dr., Vista, Calif. 92083

[21] Appl. No.: 670,614

[22] Filed: Jun. 26, 1996

[51] Int. Cl.$^6$ .......................... G01C 17/26; G01C 17/18
[52] U.S. Cl. .................... 33/355 R; 33/360; 33/364; 33/363 K; 33/354; 33/391; 33/397
[58] Field of Search .................... 33/355 R, 333, 33/356, 360, 363 R, 363 K, 365, 366, 391, 397

[56] References Cited

U.S. PATENT DOCUMENTS

| | | |
|---|---|---|
| 3,128,386 | 4/1964 | Hughes . |
| 4,047,168 | 9/1977 | Fowler . |
| 4,117,602 | 10/1978 | Lapeyre .................................. 33/352 |
| 4,577,414 | 3/1986 | Migliori ................................. 33/363 K |
| 4,720,631 | 1/1988 | Lapeyre . |
| 5,079,845 | 1/1992 | Childers ................................. 33/355 R |
| 5,448,835 | 9/1995 | Lewis .................................... 33/355 R |
| 5,469,630 | 11/1995 | Lewis .................................... 33/355 R |

*Primary Examiner*—Christopher W. Fulton
*Attorney, Agent, or Firm*—Tom Hamill. Jr.

[57] ABSTRACT

A gimballed compass apparatus with digital logic is disclosed which provides directional and attitudinal data. The apparatus comprises a rotatably mounted slotted disk wherein the slot is continuously varying in width around the circumference of the disk. The disk incorporates an elongated magnet which cause it to rotate in relation to an external magnetic field. A first and second aperture are located on the top and bottom elements of the chamber defining a light passage. The apertures have a rectangular length approximately the maximum width of the slot. The slotted disk is positioned intermediate the apertures. A light housing is provided below the chamber and includes a light source. A linear array of source detector are provided above the chamber. Each source detector element provides a response proportional to the specific amount of light incident upon it. The light beam is reflected from the aperture by a mirror to a beam focusing device. The position of the disk is thus determinable directly from the light detected by the linear array of source detectors. The assembly is gimbal mounted. Triangular slots with continuously variable width are inscribed in gimballed housings. The inclination of the housings relative to the horizon is similarly determined directly by a second and third linear array of source detectors mounted on the adjacent gimbal housing. The linear array of source detectors may be a charge coupled device (CCD). The azimuthal measurement is constrained to occur only when the compass card is in horizontal or measuring plane. The primary use of the invention is as a gimbal mounted digital compass including an alphanumeric display output of bearing, pitch and roll angles.

16 Claims, 17 Drawing Sheets

B= breakaway to show interior

B= breakaway to show interior

LOGIC FOR BINARY COMPASS AND GIMBAL ns
GIMBALLED OUROBOROS COMPASS DEVICE WITH DIGITAL LOGIC

BACKGROUND OF THE INVENTION

1. Field of the Invention

The present invention relates generally to compasses, and more particularly, to a gimbal mounted compass which utilizes light attenuation slots to develop directional and attitudinal data.

2. Description of the Prior Art

Compasses which utilize a rotating disk with a light attenuation means located thereon have been disclosed in the form of an optical shaft encoder and are well known in the art. Compass devices which employ gimballing are equally well known.

A typical example of a device which incorporates gimbal structure is U.S. Pat. No. 4,047,168 issued to Fowler. This device utilizes a disk which is photoelectrically sensed to provide output signals representative of a compass heading. It is supported by a gimbal assembly which includes pivots which serve as electrical terminals.

A typical example of a device which incorporates encoder structure is U.S. Pat. No. 4,117,602 issued to Lapeyre. This device incorporates a light emitting diode to illuminate a series of tracks on a coded disk. The tracks located on the coded disk are a plurality of alternating light transmissive and light opaque regions which represent one bit of a multiple bit digital code. A sensor array senses the light transmitted through the disk as the disk is rotated by a magnet means and through appropriate signal processing is able to decode the signals into directional information.

Other means to derive information from a light source and a compass card is shown in U.S. Pat. No. 4,577,414 to Migliori et al. This device includes a compass disk which is rotatable and has a magnet means and a light polarizing means located thereon. A light beam is split into a plurality of beams two of which pass through a first polarizing means and two of which pass through a second polarizing means, the second polarizing means having their optical axes at right angles to the first polarizing means. By comparison of the ratio of the intensities of the beams which pass through the polarizing means one may determine the angle of the magnet means in relation to a fixed axis of the compass body.

U.S. Pat. No. 4,720,631 issued to Lapeyre discloses a compass card which has a linear array in a spatial relation with a light source. Intermediate the array and the light source is a rotating disk with slots located thereon. As the disk rotates the light is passed through the slots in such a manner that the linear array may detect a certain or specific random pattern of illumination which corresponds to a specific disk position. The signals generated by the array are decoded on the basis of a unique positional calibration stored in a read-only-memory and then output to the user.

Thus, while the foregoing body of prior art indicates it to be well known to use encoder shafts and other means to determine position by utilizing digitizing means and polarization means, the provision of a more simple and cost effective electronic compass device which may be mass produced and utilized by the common man is not contemplated. Nor does the prior art described above teach or suggest a simple digital compass device which utilizes a compass card having a light transmission slot which varies in width whereby the light transmission slot attenuates the light intensity mechanically in such a manner where the instantaneous light intensity transmitted therethrough itself gives positional information.

The foregoing disadvantages are overcome by the unique compass card of the present invention as will be made apparent from the following description thereof. Simplicity is evident over the prior art in that the angular orientation is a linear function of the photon intensity striking each element of a linear array of source detectors. The photon source detectors measure directly the length of a "line of light" from the photon emission source transmitted through apertures and a slotted disk according to the number of discrete detectors stimulated in the linear array. This line length is proportional to the width of the slot on the compass card aligned with the apertures and has width proportional to the width of the apertures. The source detector array being selected to have an integrated response directly related to the number of discreet detection elements included thereon. Further, neither expensive polarizing sheets or fiber optic cables are need nor are extensive read-only-memory to store positional correlation information. Other advantages of the present invention over the prior art also will be rendered evident.

SUMMARY OF THE INVENTION

To achieve the foregoing and other advantages, the present invention, briefly described, provides a low cost, simple apparatus to yield positional information relative to a horizon and an external magnetic field of an object in motion. The apparatus includes a slotted disk wherein the slot is continuously varying in width around the circumference of the disk.

The slot inscribed in the disk used as a compass card is called an ouroboros, which have been taught by this inventor in U.S. Pat. Nos. 5,448,835 and 5,469,630 for digital compasses and are incorporated herein as reference.

Ouroboros is an archaic term applied to a tail biting dragon or serpent used to symbolize circumference or eternity. In the context of this disclosure it is used as a noun to describe a right triangle where the hypotenuse and side opposite are pulled at the apex of the angle which joins them in a circle. The apex so rotated then approaches or touches the side opposite that apex at the base of the right angle. The side adjacent to the hypotenuse is radial to the center of the disk. A similar construct can be made from any triangle or trapezium. The term ouroboros is used to describe the continuously varying width slot of the slotted disk of the instant invention and will be referred to as such below. The ouroboros may be fabricated by using etching, cutting or printing techniques as a single piece on a transparent substrate. Certain other techniques of fabrication such as laser cutting, photo-chemical etching or stamping require that the ouroboros be fabricated as two pieces consisting of a cam part and a ring part. The cam part fits centrally inside the ring and may either be mounted as two pieces or as a single piece by affixing the cam to the ring using a suitable transparent material.

The slotted disk incorporates a magnet or magnets which cause it to rotate in relation to an external magnetic field. The disk is mounted inside a chamber by a central pivot which permits the disk to rotate freely. A cylindrical chamber surrounds the slotted disk, the cylindrical chamber has a top element, a bottom element and a side element. The cylindrical chamber may be fluid filled, the fluid acts as a damping means as is well known in the art. The wall of the cylindrical chamber allows a low power laser or other highly collimated radiation source to pass through the fluid space between the slotted disk and the bottom element. Such a collimated radiation source will be reflected by mirrors on the cylindrical wall. The cylinder wall itself may be reflective to obviate the need for mirrors. The wall of the cylindrical chamber thus allows a laser or other radiation detector to receive the radiation reflected about the chamber wall. As the slotted disk tilts on its mount it breaks the laser beam and gives a disk "out of plane" signal. Positional data obtained when the disk out of plane signal is present is ignored by the microprocessor since it is obtained while the compass card is out of the measurement plane. Said signal apparatus eliminates the necessity of vertical dampening (motion in the y-z and x-z planes) provided by a fluid, however such fluid may still be utilized for horizontal dampening (motion in the x-y plane).

A first and second aperture are located on the top and bottom of the cylindrical chamber defining a light passage. The apertures are rectangular and have a length approximately the maximum width of the variable width slot. The slotted disk is positioned intermediate the apertures with the slot located in the light passage. The slot inscribed in the disk is termed an ouroboros or ouroboric slot being defined as a slot of continuously variable width which varies from a maximum to a minimum through an angular distance of approximately 360 degrees. The minimum width is less than or equal to one aperture width and may meet proximally at either end of the maximum slot width, at the mid-point, or any position in between. The light passage dimensions are selected to be at least 3 to 5 times greater than the photon wavelength employed as an illumination source.

A light (emission) housing is located below the cylindrical chamber. The light housing includes a photon source which is selected to be isotropic and of a type which may be detected by the linear array of source detectors. The combination of the emission housing and the cylindrical chamber are known as the first housing assembly.

A charged couple device or CCD is a typical linear array of photon sensitive detectors. Each discrete element of the CCD array is sensitive to photons striking it, including photons in the visible region of the spectrum, and each discrete element collects charge proportional to the intensity of photon intensity striking it. Photons of energy in the visible region of the electromagnetic spectrum are commonly referred to as simply light rays or beams. The detectors in the linear array may be summed or individually polled. The sum of the total charge collected instantaneously may be used to measure the total intensity of light incident upon the array. Or, alternatively, each individual detector in the array may be independently polled to determine the state of charge in each. Each discrete detector element in the array may be considered to be in either of two states: ON, when photon intensity above some predefined threshold is incident on the element; or, OFF, when photon intensity below some predefined threshold is incident on the element. This allows that the output from the detector array be digital and independent of the intensity anisotrophy of the emission source. Known electronic design allows for determination of analog levels of charge in each element of the array and processing to provide for a multiplicity of states, rather than simply ON or OFF. Use of detector states other than ON or OFF require that a reference detector be used to compensate for variations in emission source intensity and temperature fluctuations.

In the preferred embodiment a CCD source detector sensitive to visible light is located atop the cylindrical upper chamber. The CCD source detector generates a signal proportional to the number of its linearly arrayed detectors which are stimulated by the light which passes through the chamber. This number illuminated varies in direct proportion to the amount of light which passes through the slotted disk. The light beam that passes through the chamber is attenuated first by the bottom aperture and then by the positional area of the slotted disk. The remaining light beam which passes through the top aperture is then reflected by a mirrored surface to a beam focusing optical device. The beam focusing optical device may consist of lens, mirrors, prisms, fiber optic cables or other suitable photon coupling devices. The light beam which passes through the top aperture is considered herein as a "line of light" since the illumination has width proportional to the aperture width and a length of direct proportion to the width of the ouroboros slot positioned under the aperture. The beam focusing optical device finitely focuses the beam and, hence, focuses the line of light on to the sensitive areas of detector elements comprising the CCD. A number of detectors are activated by the line of light falling incident upon them. An electrical signal is generated proportional to the number of detectors activated. This electrical signal is directly proportional to the ouroboros disk position and hence the direction the device is pointed.

The emission housing is a generally half-spherical wall. The wall includes a first elongated triangular slot, defining a second light passage.

The cylindrical chamber and emission housing form a first housing with the center of mass near the bottom. The first housing is gimbal mounted. The gimbal depends from a second housing. The light passes through the first elongated triangular slot, which attenuates the light beam proportional to the inclination of the first housing. The attenuated light beam in turn passes through a rectangular aperture on the second housing where it falls on a mirrored or other reflective surface. The mirrored surface reflects the light into a second beam focusing optical device. The second beam focusing optical device finitely focuses the beam and projects the line of light onto the second CCD. A number of detectors are activated by the light falling upon them. An electrical signal is generated proportional to the number of detectors activated. This electrical signal is directly proportional to the length of the line of light passing through the aperture and hence the instantaneous inclination angle of the first housing.

The first housing is enclosed by an second housing and the second housing is enclosed by the third housing. The first housing is gimbal mounted to the second housing and the second housing is gimbal mounted to the third housing. The emission housing (the lower portion of the first housing) contains an opening having a centroid approximately 90 degrees to the centroid of the first triangular slot also inscribed on the emission housing. The second housing contains a second triangular slot proximal to the opening in the first housing. The light passes from the emission housing (the lower portion of the first housing) through the opening, and then passes through the second elongated triangular slot in the second housing. The triangular slot in the second housing attenuates the light beam proportional to the inclination of the apparatus. The attenuated light beam in turn passes through a rectangular aperture on the third housing where it falls on a mirrored surface. The mirrored surface reflects the light into a third beam focusing optical device. The third beam focusing optical device finitely focuses the beam and projects the line of light onto the third CCD. A number of detectors are activated by the light falling upon them. An electrical signal is generated proportional to the number of detectors activated. This electrical signal is directly proportional to the length of the line of light passing through the aperture and hence the instantaneous inclination angle of the second housing.

The first, second and third CCD source detectors provide a response to the physical amount of light incident upon them. As the slotted disk rotates the continuously variable width of the slot located on the disk linearly attenuates the light intensity relative to the first CCD source detector. As the slotted disk tilts on its' pivot out of the measuring plane a signal is generated by the laser beam detector when the reflected laser beam is broken. As the gimbal mounted first housing tilts, the continuously variable width of the triangular slot located on the wall linearly attenuates the light intensity relative to the second CCD source detector. As the gimbal mounted second housing tilts, the continuously variable width of the triangular slot located on the second housing wall linearly attenuates the light intensity relative to the third CCD source detector. The position of the disk, as well as the first and second housing's relative inclination are thus determinable from the electrical signals generated by the first, second and third CCD source detectors. The electrical signals may be conditioned and processed in a microprocessor to generate an LCD output and be stored to yield orientation information as a function of time.

The primary use of the invention is as a gimbal mounted compass which would include a digital output of direction and spacial orientation of an object translating in space when the compass card is level with the horizon. The invention would be mounted to the object. The object may be a vehicle such as an automobile or truck, a boat, ship or submersible, an aircraft or missile, or a rocket. Other objects which move through space exist and may utilize this invention. Applications include terrestrial navigation on land, sea and air as well as applications in orbital and non-orbital space travel.

GENERAL THEORY OF OPERATION

The gimballed compass disclosed herein comprises a rotatably mounted slotted disk on which is mounted an elongated magnet or magnets. The slotted area of the disk forms a passage, this passage is proximal to the circumference of the disk. The slotted disk is affixed in a cylindrical chamber. A photon or light source resides below the cylindrical chamber in a light source housing. Photons from the source pass through the cylindrical chamber which surrounds the slotted disk. Photons pass through a first and second aperture located on the top of the chamber and the bottom of the chamber.

The top aperture and bottom aperture are rectangular and define a light passage through which photons from the light source pass. The rectangular apertures are covered by a membrane transparent to the detectable light spectrum. The light passes through the first aperture, the variable width slot in the rotatably mounted disk, and the second aperture. The light beam which passes through the second aperture casts an image of the aperture on a mirror. This image is reflected through a first light beam focusing device and then strikes the first CCD light detector. The CCD light detectors employed in the apparatus have a well known linear response function, depending on the number of detectors activated. The CCD light detector is composed of a finite number of individual detectors arrayed in a linear configuration. CCD linear arrays are commonly available containing 1024, 4096 up to 12,000 or more discrete detector elements commonly referred to as pixels. CCD arrays may be used individually or in combinations. Each discrete detector element may be either ON or OFF. When a detector is ON, ie: when light is falling incident upon it relative to some threshold, an electrical signal is generated. By summing the individual electrical impulses, an electrical signal is generated directly proportional to the light beam width and length. The slot width changes continuously and linearly as the disk rotates such that the light 1 0 intensity striking the first mirrored surface varies as the disk rotates. The first mirrored surface reflects the light through a light beam coupler which focuses the light beam. This beam focusing gives a greater accuracy, since the focused beam is of a known proportion to the beam entering the light beam coupler and allows that the aperture and CCD be of different dimensions. This focused beam also varies as the disk rotates and the focused beam then falls on the first CCD light detector. The attenuation of the light passing through the slotted disk gives the resultant light beam directional information, as the length of the line of light passed there through, with regards to which direction the gimballed compass device is pointed relative to an external magnetic field. When a CCD array containing 1024 discrete detector elements is used, the planar angular resolution is approximately 0.35 degrees (360/1024).

The quality of azimuthal directional information from the slotted disk is dependent upon the slotted disk remaining in a horizontal measuring plane. Vibration and oscillation of the housing causes the compass card to move on its' pivot into and out of a level x-y plane relative to the horizon (y-z and x-z motion). Said level x-y plane is termed the "measuring plane". A hole in the wall of the cylindrical chamber allows the beam of a low power laser or other highly collimated photon beam to enter the chamber. The laser beam is reflected in a plane about the interior of the chamber, the beam being reflected by reflectors on the interior wall of the cylindrical chamber or the cylinder wall itself. The walls themselves may be polished, coated with reflective material or mirrors fixed at strategic points about the interior wall. The plane of the reflected laser beam is parallel and proximal to the measuring plane of the slotted disk. The multiply reflected laser beam strikes a laser beam detector. When the slotted disk tips out of its' level measuring plane the laser beam is interrupted and the digital position information is not used in determining azimuthal position. Digital position information regarding the current azimuth is used only when the slotted disk is within a critical angle of the measuring plane, approximately 1 to 3 degrees from the horizontal.

The light source housing is located below the cylindrical housing. The light source housing includes the light source which is suitably mounted therein. The light source housing is a generally half-spherical wall. The wall includes a triangular slot which defines a second light passage. The cylindrical chamber and the light source housing form a first housing. The first housing is gimbal mounted. The gimbal depends from the second housing. The second housing has a second CCD light detector and an aperture mounted thereon in such a manner to detect emissions from the second light passage. When the light beam passes through the second light passage it falls incident on a second mirrored surface. This second mirrored surface reflects the light to the second light beam coupler. This second focused beam of light falls on the second CCD light detector and generates an electrical signal proportional to the inclination. As the first housing tilts in the gimbal mount, reflecting a change in inclination, the light beam width as detected by the second CCD light detector will vary relative to that inclination.

The first housing is gimbal mounted to the second housing. The second housing is gimbal mounted to the third housing. The second housing gimbal mount is perpendicular and co-planar to the first housing gimbal mount, with another beam coupler and detector located on the third housing. A second triangular slot is provided on the half-spherical wall, defining a third emission passage. Through a similar mechanism as discussed above, additional information concerning inclination, or roll, is developed for the second housing motion in a plane perpendicular to the first housing plane.

The discussion of the preferred embodiment will fully illuminate the operation of the disclosed device.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

This invention provides for directional, attitudinal and positional information with respect to orientation in an external magnetic field which can be recorded, displayed or utilized in real-time.

As such, it is an object of the present invention to provide a light weight, low cost electronic orientation device with digital output sensitive to an external magnetic field having simple circuitry and logic.

Another object of this invention is to provide a light weight, low cost electronic orientation device with digital operation sensitive to an external magnetic field having simple circuitry and logic;

Another object of this invention is to provide a low cost compass which provides for a signal which varies linearly with a direction indicated. This is accomplished by providing a slot of continuous, linearly varying width on the compass card and by employing a linear array of discrete detectors which, in combination, provide an electrical signal which is a linear function of the beam width incident on the array;

Another object of this invention is to provide a compass which yields directional or azimuthal information only when the compass card is in a horizontal position or "measuring plane" thus eliminating errors caused by tilt of the compass card;

Another object of this invention is to provide a compass which yields a measure of the instantaneous bearing with the compass card in a measuring plane with out the necessity of using a fluid for horizontal (x-y) plane dampening;

Another object of this invention is to provide a low cost, high resolution compass which is gimbal mounted; which includes linear arrays of light detectors affixed in such a fashion as to yield a linear response from a light source such that the spacial angle of the compass position relative to the horizon is a linear function of the intensity striking said source detectors and can be measured, displayed and utilized;

Another object of this invention is to provide a low cost, high resolution directional orientation device for measuring bearing at simultaneous pitch and roll angles. The orientation resolution is a function of; (1) the rate of change of width of the ouroboros slot under the aperture, (2) the rate of change of width of each triangular slot under its aperture, and, (3) the response sensitivity of the linear array of source detector means employed;

Another object of this invention is to provide a low cost, high resolution gimbal mount which will provide an indication of the attitude relative to the horizon of a gimballed apparatus, such as a compass or gyroscope.

Another object of this invention is to provide a low cost means for determining when a gimbal mounted device is in or near a horizontal plane, such as a compass card or flux gate compass.

It is another object of the present invention to provide a new an improved directional orientation device which may be easily and efficiently manufactured and marketed.

It is another object of the present invention to provide a directional orientation device which has all of the advantages of the prior art and none of the disadvantages.

It is a further objective of the present invention to provide a directional orientation device which is of durable and reliable construction.

An even further object of the present invention is to provide a directional orientation device which is susceptible of a low cost of manufacture with regard to both materials and labor, and which accordingly is then susceptible of low prices of sale to the consuming public, thereby making such a directional orientation device readily available to the buying public.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

To meet the aforementioned objectives the following preferred embodiment is disclosed.

Figure 1:
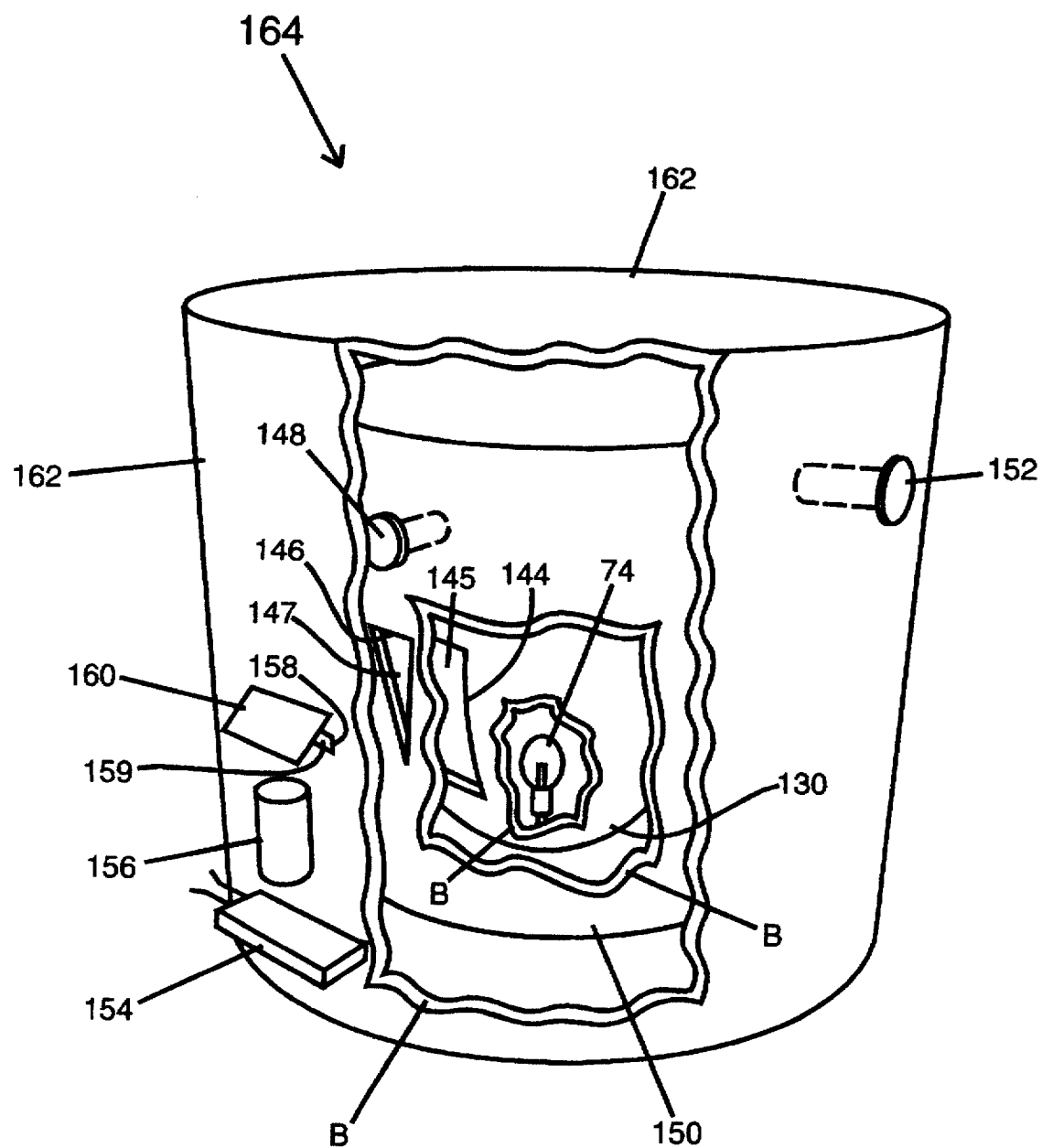
FIG. 1 is a cut away view showing the relative spacial arrangement of the gimbal mountings with respect to the first, second and third housings as well as the arrangement of the pitch detector elements.

Referring now specifically to FIG. 1, a gimballed compass device 164 which generates three dimensional orientation data is shown in break away to describe first the outer elements for the instant invention.

The compass device 164 includes a third housing 162 which depends by gimbal means 152 from second housing 150. Gimbal means 152 is shown in break away in FIG. 1. Second housing 150, being bottom weighted, has inscribed on one side a triangular slot 146 through which radiation emanating from isotropic emission source 74 passes. Triangular slot 146 has membrane 147 which is transparent to emanations from emission source 74. Radiation from emission source 74 passes first through emission passage 144 then through triangular slot 146 and its membrane 147, where it is attenuated by aperture slit 158. Aperture slit 158 has membrane 159 which is transparent to emanations from emission source 74. Attenuated radiation passing through slit 158 is reflected by mirror 160. Mirror 160 contains an instant image of aperture slit 158 which is illuminated by and attenuates radiation passing through triangular slot 146. The length of the illumination line of aperture slit 158 is related to the instant width of triangular slot 146 aligned with source 74 and slit 158, hence, the instant orientation of second housing 150 on its gimbal mount. The width of the illumination line is proportional to the width of aperture slit 158. The illumination image is focused by beam coupler 156 onto a linear array of emission source detectors 154. The number of detectors illuminated is thus determined by the orientation of bottom weighted second housing 150 on its gimbal. The number of detectors illuminated on detector array 154 therein indicate the relative position of second housing 150. The combination of aperture slit 158, mirror 160, beam focusing device 156 and detector array 154 comprise third housing detection element 161.

Figure 2:
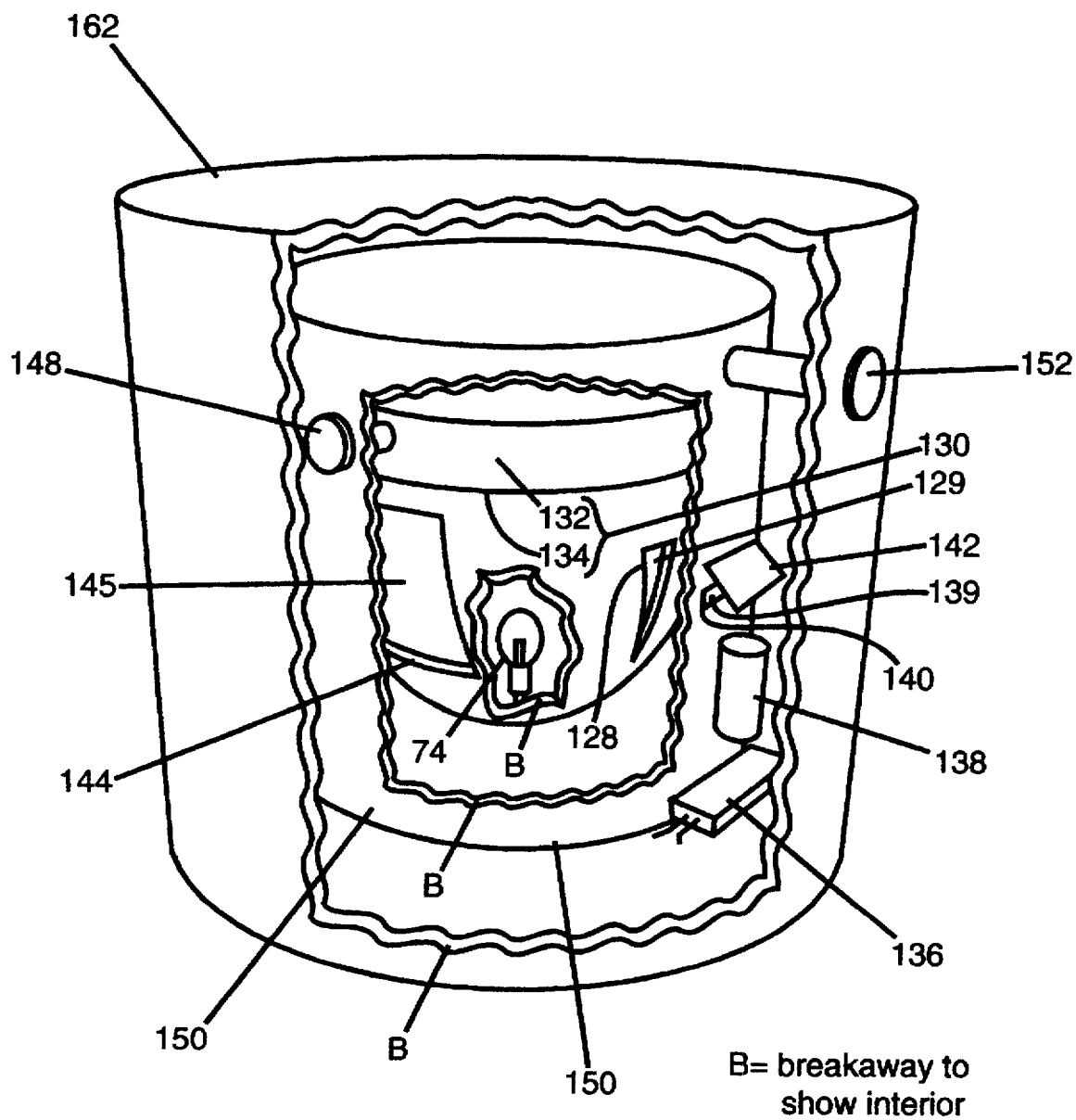
FIG. 2 is a cut away view showing the relative spatial arrangement of the gimbal mountings with respect to the first, second and third housings, as well as the relative arrangement of the roll detector elements.

Referring now to FIG. 2. First housing 130 is mounted by gimbal means 148 inside of second housing 150 which depends from third housing 162 by gimbal means 152. Second housing 150 has inscribed, at approximately 90 degrees to emission passage 144, triangular slot 128. Triangular slot 128 has membrane 129 which is transparent to emanations from emission source 74. Photons from emission source 74 are attenuated by triangular slot 128 and is further attenuated by aperture slit 140. Aperture slit 140 has membrane 139 which is transparent to radiation from emission source 74. Mirror 142 reflects radiation passed from emission source 74 through triangular slot 128 and aperture slit 140. An instant image of the illumination line of aperture slit 140 is present on mirror 142 and is focused by beam coupler 138 onto linear detector array 136. The number of detectors illuminated is thus determined by the orientation of bottom weighted first housing 130 on its gimbal. The number of detectors illuminated on detector array 136 therein indicate the relative position of first housing 130. The combination of aperture slit 140, mirror 142, beam focusing device 138 and detector array 136 comprise central detection element 143. First housing 130 consists of emission chamber 134 and cylindrical chamber 132, best illustrated in FIG. 4.

As second housing 150 moves relative to an initial position of third housing 162 a signal is generated by detector array 154. Simultaneously as first housing 130 moves relative to an initial position of second housing 150 and third housing 162 a signal is generated by detector array 136. The result of these signals is to quantify the position of second housing 150 and first housing 130 relative to an initial position of third housing 162.

Figure 3:
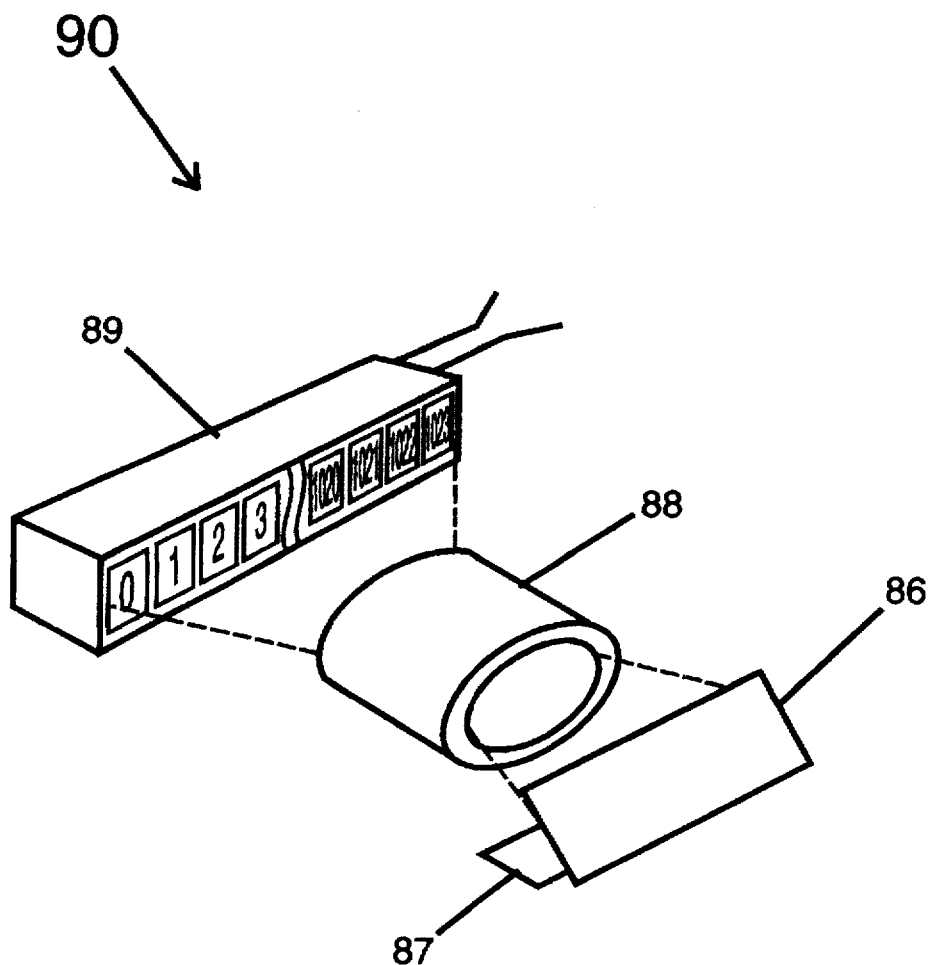
FIG. 3 presents a generic detector element consisting of an aperture, reflector, beam focusing device, and linear detector array.
Figure 5:
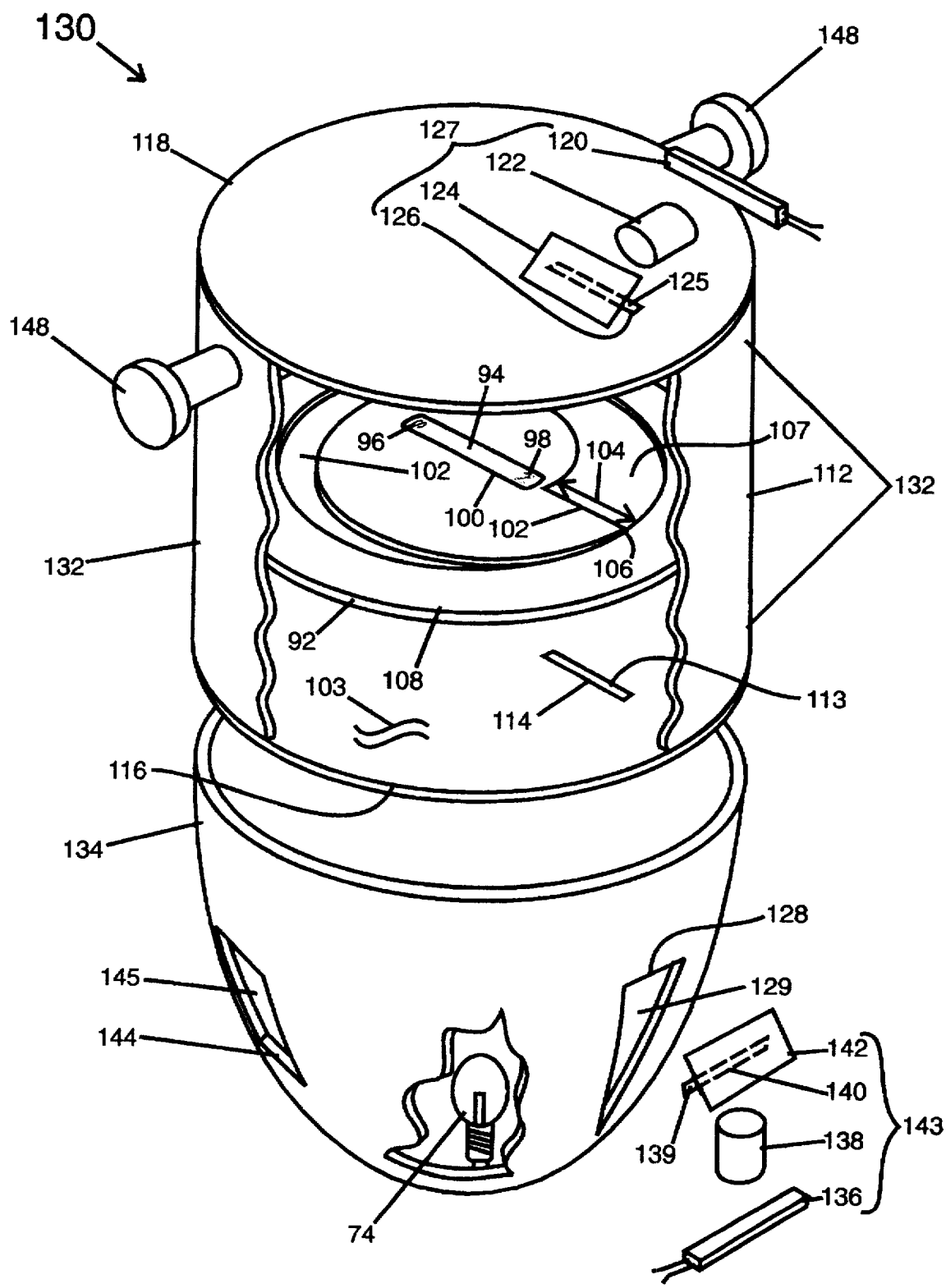
FIG. 5 is an isometric cut-away of the emission housing showing the spacial relationship of the critical elements.

FIG. 3 illustrates generic detection element 90 mounted on third housing 162, second housing 150, and the top of cylindrical chamber 132 (best illustrated in FIG. 5). Attenuated radiation passes through generic aperture slit 87 onto generic mirror 86. Generic mirror 86 contains an instant image of the orientation of the attenuation elements, triangular slots, ouroboros and associated apertures, of the instant invention and said image is focused by beam focusing device 88 onto linear detector array 89. Detection element 90 may be covered to prevent stray radiation from striking generic detector array 89 and thus improve the quality of positional information generated by detector 89. Mirror 86 is selected to provide space economy in the preferred embodiment and beam focusing device 88 may be used without mirror 86 by focusing radiation directly from aperture 87 onto detector array 89. Beam focusing device 88 allows that aperture slit 87 and detector array 89 be of different physical dimensions and is selected to provide an image of slit 87 onto detectors 89 which covers the sensitive areas of detectors contained in the array. Beam focusing device 88 is selected to be a mirror, combination of lenses, fiber optic bundles, prisms, or other photon focusing devices such as to provide an instant image of attenuated radiation from aperture slit 87 onto detector array 89.

Figure 4:
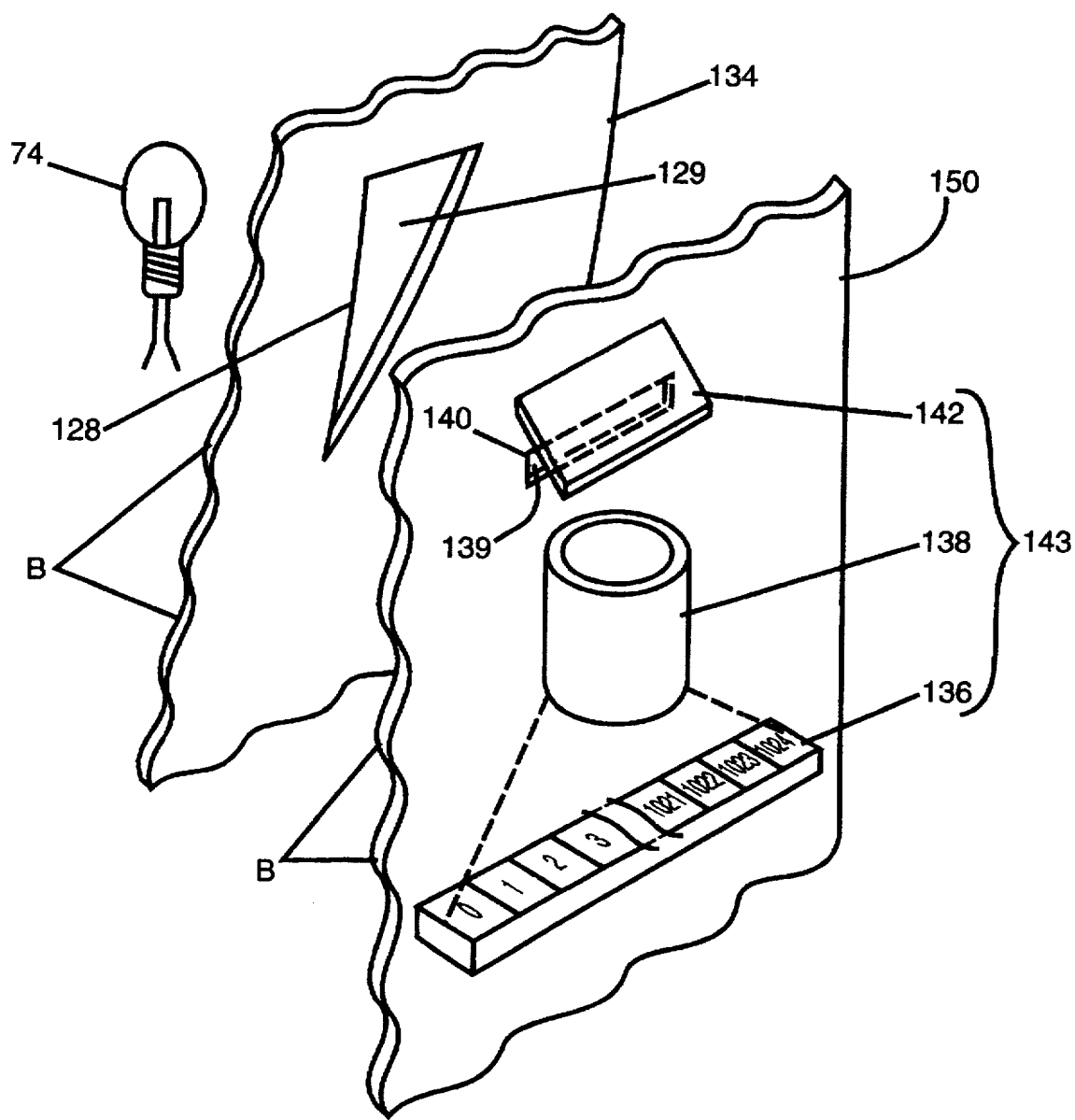
FIG. 4 shows the spacial relationship between the source, the first housing triangular slot and the first housing detector elements.

FIG. 4 illustrates the spacial relationship of detector element 143, mounted on a break away of second housing 150, as it relates to triangular slot 128, inscribed in first housing 130, and emission source 74. As first housing 130 swings on gimbal mount 148 relative to second housing 150 triangular slot 128 moves relative to aperture slit 140. The portion of the width of triangular slot 128 planar to aperture slit 140 varies linearly and continuously as first housing 130 moves. A portion of emission from source 74 passes through aperture 140 and transparent membrane 139 and is reflected by mirror 142. The intensity of radiation reflected is directly proportional to the width of triangular slit 128 planar with aperture 140. Beam focusing device 138 finitely focuses the reflection onto detector array 136. The number of discrete detector elements illuminated thus determine the instant orientation of first housing 130.

FIG. 5 illustrates first housing 130 composed of gimbal mounts 148, emission chamber 134 and cylindrical chamber 132. First housing 130 is therein depicted separated from second housing 150 and third housing 162. Depicted in FIG. 5 is the spacial relation of triangular slot 128, membrane 129 and inner detector element 143. Inner detector element 143 is composed of aperture slit 140, mirror 142, beam focusing device 138 and detector array 136. Emission passage 144 is depicted on emission housing 134 and the spacial relationship between emission passage 144, triangular slot 128 and emission source 74, shown in break away, slot membrane 107 is illustrated. Cylindrical chamber 132 has a cylindrical wall 112, a bottom element 116 and a top element 118. Bottom element 116 has aperture slit 114 which attenuates emission from emission source 74. Aperture slit 114 has transparent membrane 113 which is transparent to radiation emanating from emission source 74.

Referring now again to FIG. 5. Cylindrical chamber 132 contains slotted disk 108 which depends from bottom element 116. Disk 108 has a center 94, a circumference 92 and a slot 102 of variable width. A magnet 100 depends from slotted disk 108. The magnet 100 has a north pole 98 and a south pole 96. Slot 102 is inscribed in disk 108 and has a membrane 107 which is transparent to radiation emitted by source 74 and provides structural integrity for disk 108. The width of slot 102 varies from a maximum 104 to a minimum 106 continuously and linearly from 0○ to 359○. Affixed to top element 118 is detector element 127 composed of aperture 126, mirror 124, beam focusing device 122 and linear detector array 120. Aperture 126 has aperture membrane 125 which is transparent to emanations from source 74. Disk 108 depends such that it rotates freely as the result of a force applied by an external magnetic field. Magnet 100 is attached to disk 108 and as disk 108 moves thorough a circle from 0○ to 359○ the width of slot 102 between apertures 126 and 114 varies, continuously and linearly.

Emission source 74 emits radiation which is attenuated by aperture slit 114 containing membrane 113. The attenuated radiation is further attenuated by the instant width of slot 102 whilst passing through slot membrane 107. The radiation which passes is further attenuated by aperture 126 whilst passing through slot membrane 127. The resultant radiation is reflected by mirror 124 of detector element 127. In detector element 127 mirror 124 receives an instant image of aperture 126. This instant image is focused by beam focusing device 122 onto the detectors of linear detector array 120. The number of detectors in detector array 120 stimulated are directly proportional to the instant angular orientation of slotted disk 108 and hence the orientation of slotted disk 108 in an external magnetic field. In the preferred embodiment slotted disk 108 is a compass card, hence the orientation is determined relative to the earth's magnetic field.

Figure 6:
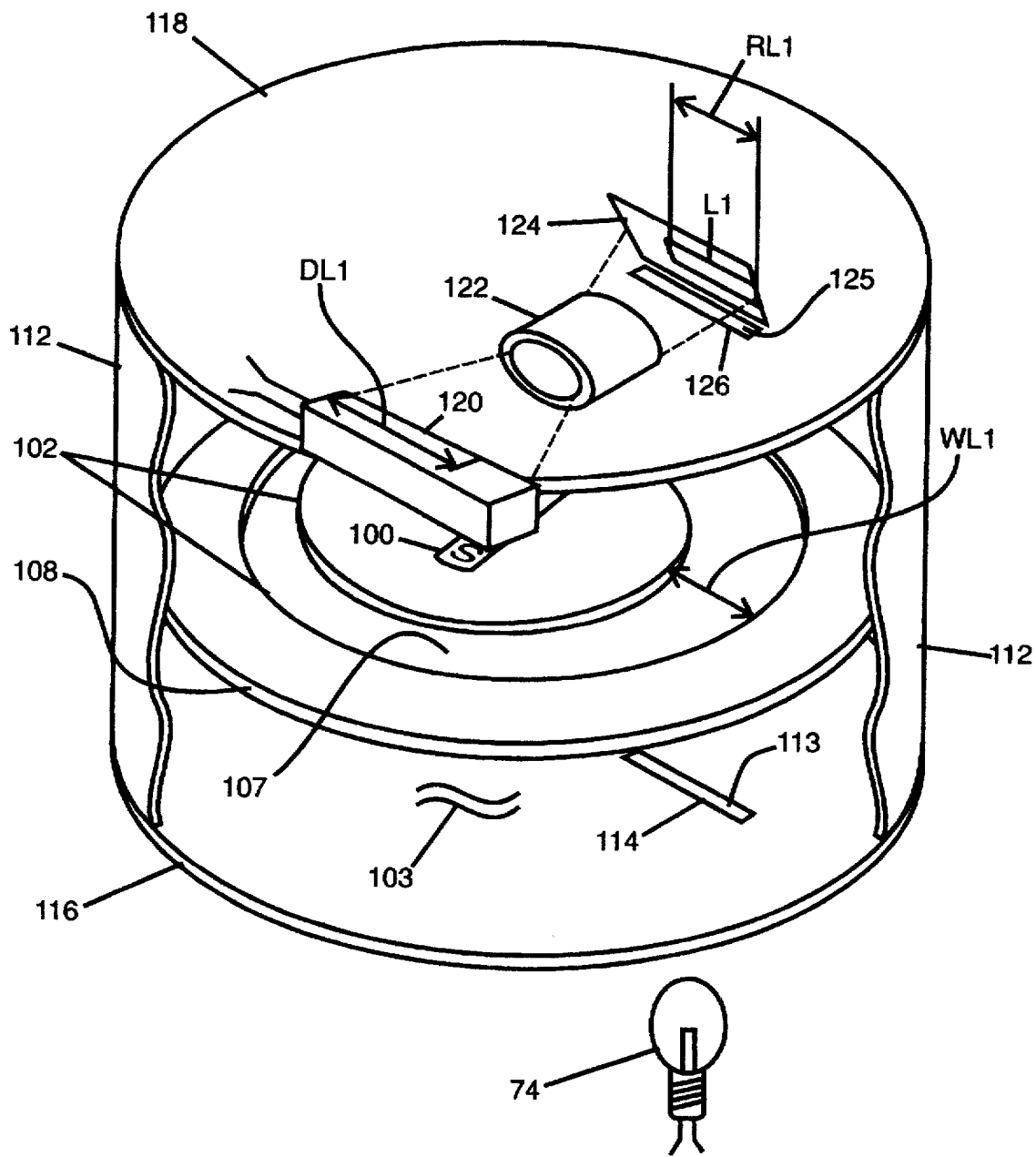
FIG. 6 presents a cut away of the portion of the cylindrical chamber showing the relationship of the slotted disk, apertures, mirror, beam coupler and CCD array to illustrate the line of light, WL1, reflected by the mirror, RL1, and incident upon the detector, DL1, for one position of the ouroboros slot.

Referring now specifically to FIG. 6. Emission source 74 is isotropic and emits photons of a type which are detectable by all detection elements. Specifically source 74 emits radiation a portion of which passes through aperture 114, thence a reduced portion passes through slot 102 of disk 108, thence passes through aperture 126. The instant width of slot 102 is WL1 on FIG. 6. WL1 is directly proportional to the "line of light", L1, incident on mirror 124 and causes reflection of length RL1. Reflection RL1 is focused by beam focusing device 122 onto detector array 120 yielding image DL1 which stimulates a number of detectors on detector array 120. Detector element 127 causes the instant intensity of WL1, RL1 and DL1 to be all in direct proportion to each other.

Figure 7:
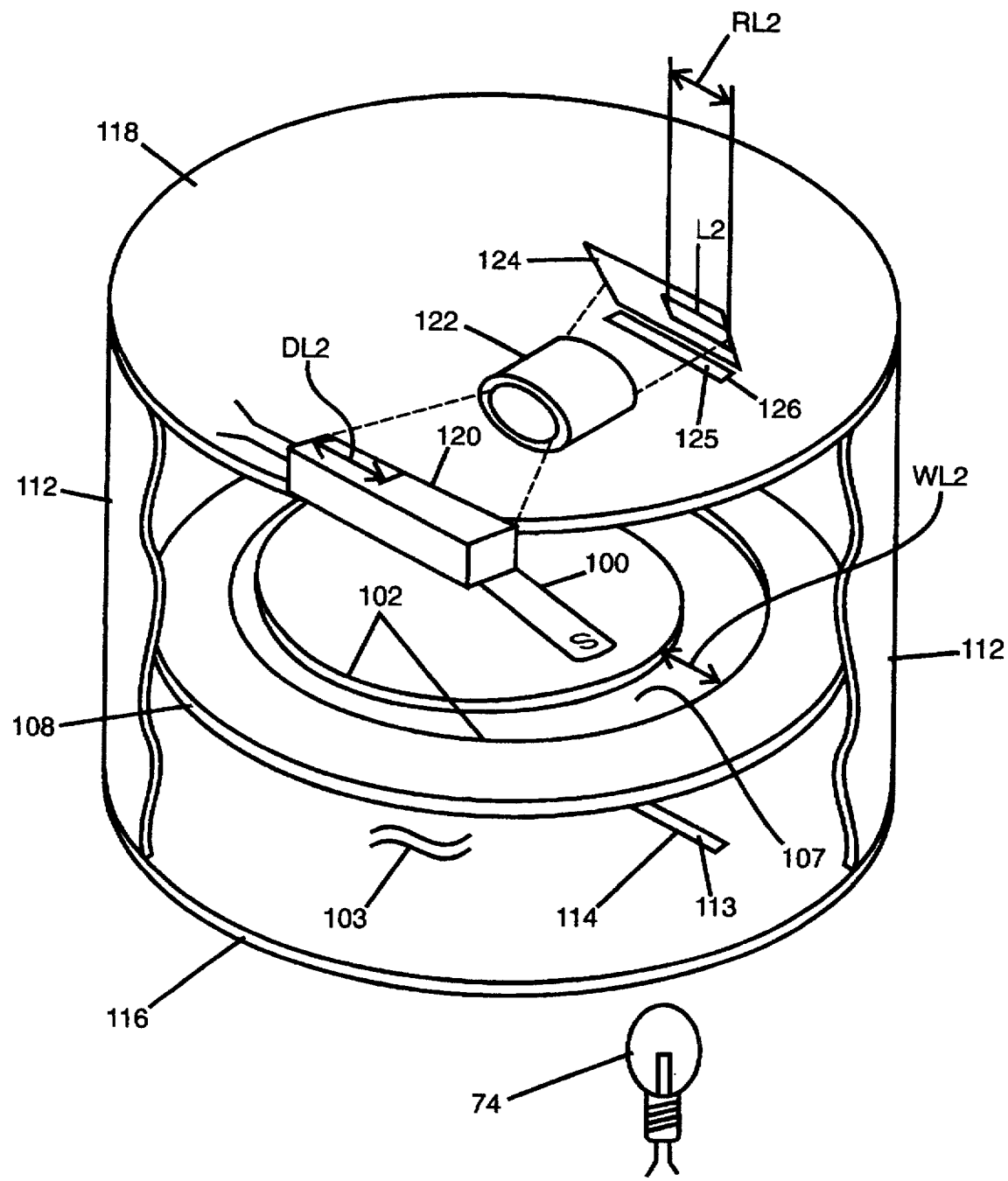
FIG. 7 presents a cut away of the portion of the cylindrical chamber showing the relationship of the slotted disk, apertures, mirror, beam coupler and CCD array to illustrate the line of light, WL2, reflected by the mirror, RL2, and incident upon the detector, DL2, for a second position of the ouroboros slot.

Referring now specifically to FIG. 7 which shows slight the rotation of disk 108 to a new position from that of FIG. 6. Source 74 emits radiation a portion of which passes through aperture 114, thence a reduced portion passes through slot 102 of disk 108, thence passes through aperture 126. The instant width of slot 102 is WL2 which is directly proportional to the "line of light", L2, incident on mirror 124 and causes reflection of length RL2. Reflection RL2 is focused by beam focusing device 122 onto detector array 120 yielding image DL2 which stimulates a number of detectors on detector array 120. Detector element 127 causes the instant intensity of WL2, RL2 and DL2 to be all in direct proportion to each other. In FIGS. 6 and 7, WL1>WL2, L1>L2, RL1>RL2 and DL1>DL2, wherein each illuminated detector in the detector array, measured as DL1 and DL2, add discretely to the length of the line of light detected which is related to the instant orientation of slotted disk 108.

Figure 8:
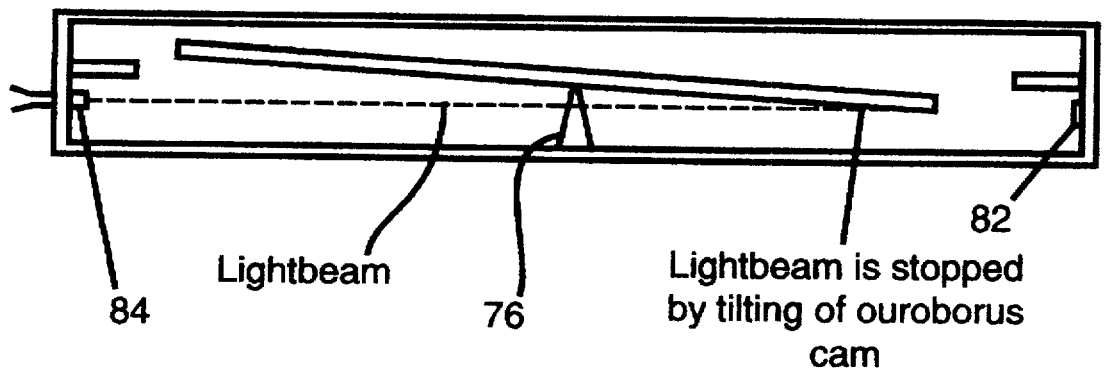
FIG. 8 is a top view cross section of the laser source path, reflectors and laser source detector illustrating a spacial relationship between these elements.
Figure 8A:
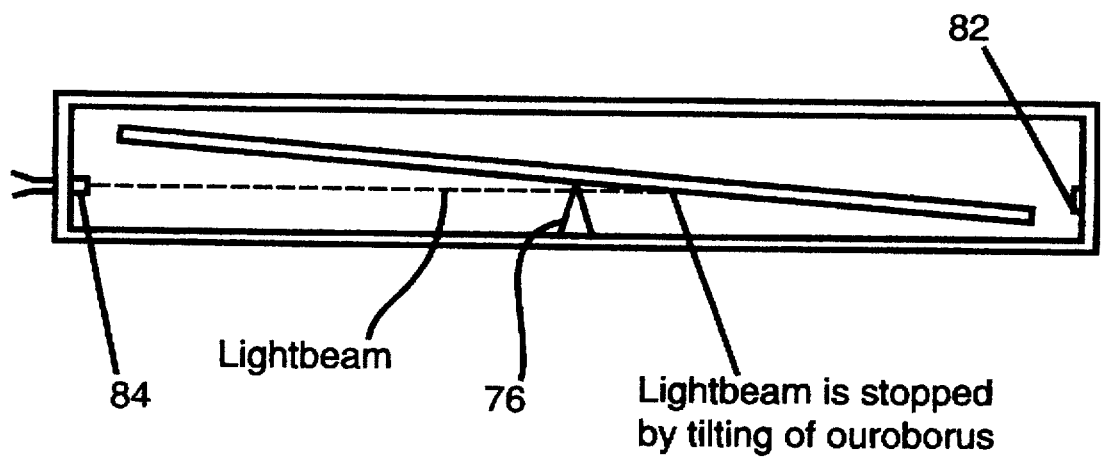

FIG. 8 is a top down view of cylindrical chamber 132 through cylinder wall 112 showing the placement of the out-of-plane sensing elements. Semiconductor laser or collimated light source 84 illuminates specular reflector 82. Reflector 82 being positioned such that it reflects incident illumination to specular reflector 80. Reflector 80 being positioned to reflect incident illumination to source detector 78. Source 84, reflectors 82 and 80, source detector 78 depend from cylinder wall 112 and the light beam from source 84 is reflected such that light is reflected in a triangular plane beneath slotted disk 108. The interruption of said plane defined by said light triangle by slotted disk 108 indicates that it is out of its measuring plane.

Figure 9:
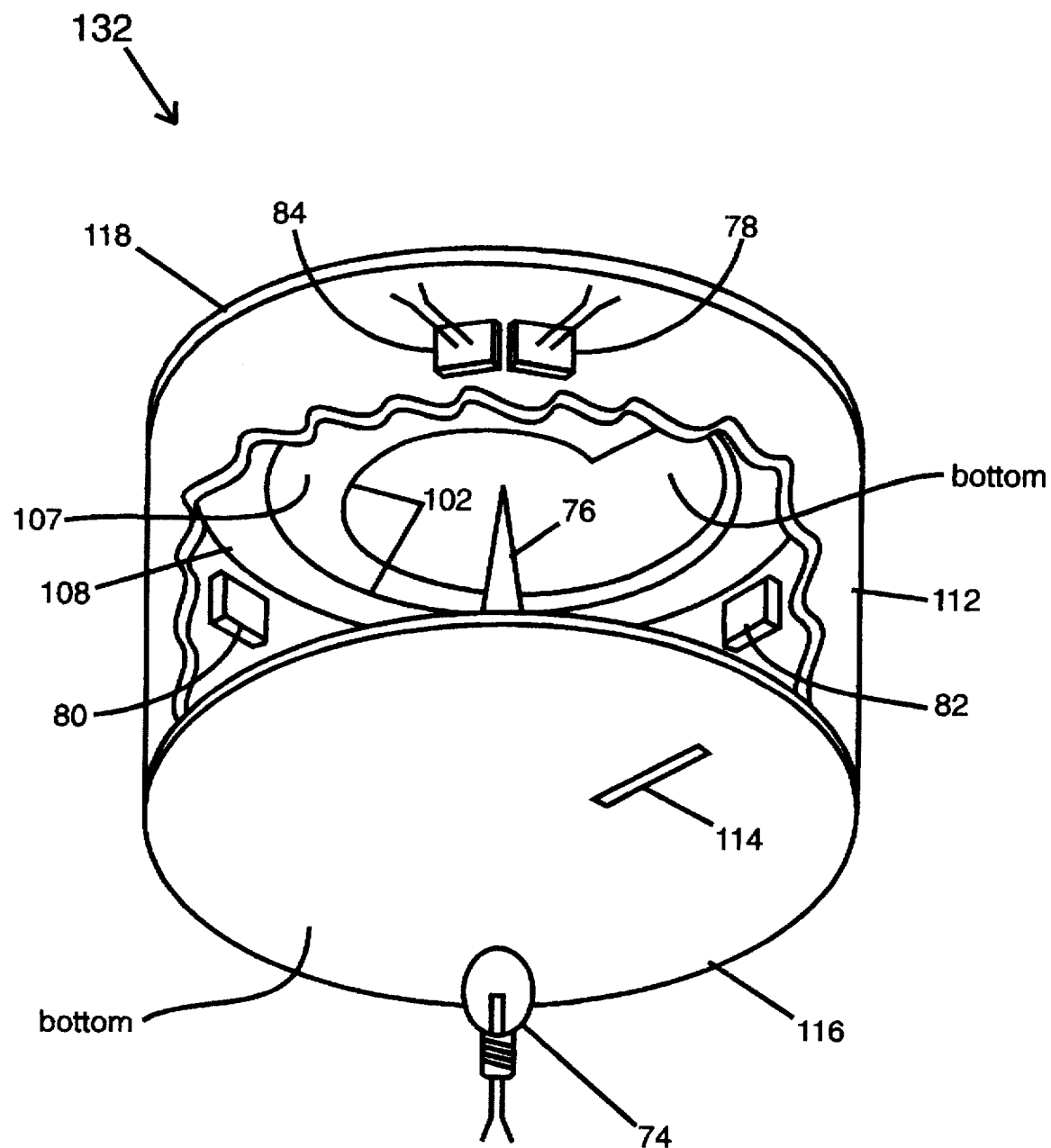
FIG. 9 is an upward looking view of the ouroboros disk to show the position of the laser source, reflectors and source detector to form a parallel plane with the measuring plane of the compass card.

FIG. 9 is an isometric view through the bottom of cylindrical chamber 132 showing the relationship of elements used to sense the out-of-plane alignment of slotted disk 108. Slotted disk 108 with ouroboros slot 102 covered with membrane 107 depend from pivot 76. When disk 108 tilts from the horizontal measuring plane the laser source 84 is thus blocked by a portion of slotted disk 108 and hence is not sensed by the source detector 78. The microprocessor, being inhibited by software, does not allow a bearing sample to be processed when source detector 78 does not sense source 84.

Figure 10:
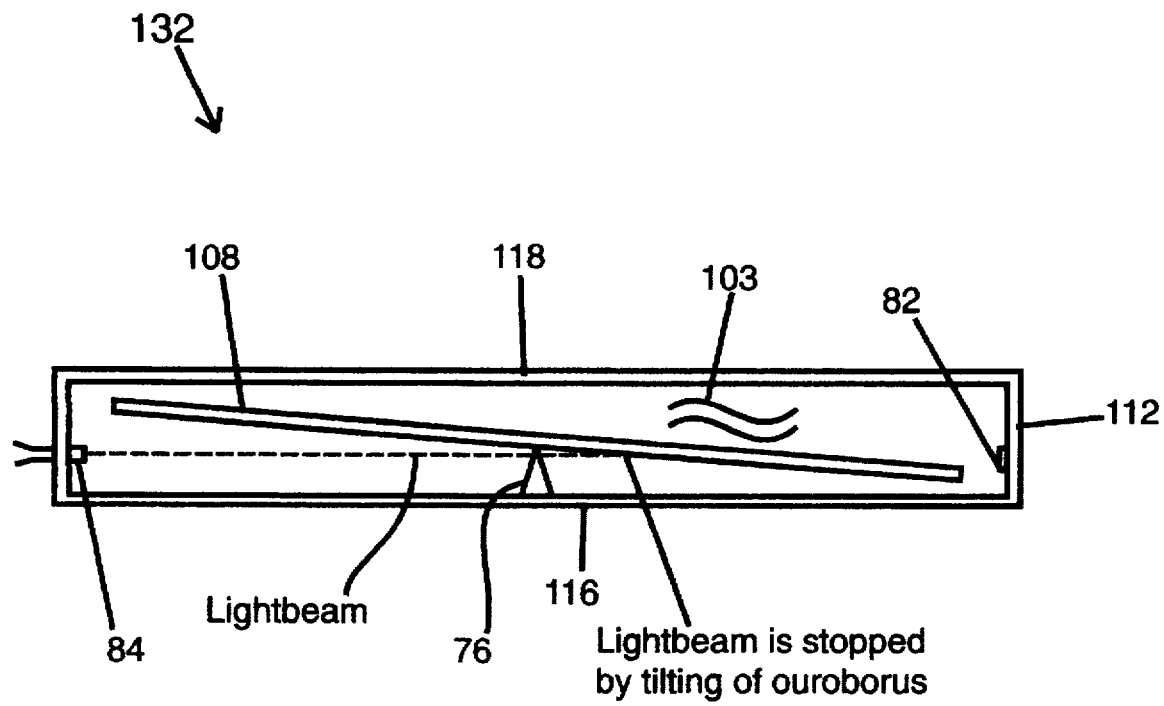
FIG. 10 is a side view cross section of laser path, reflectors and laser source detector illustrating the intersection of the slotted disk into the laser path plane, hence, the interruption of bearing measurement.

FIG. 10 is a cross sectional view of cylindrical housing 132 through top element 118, wall 112 and bottom element 116. As disk 108 tilts a few degrees out of a "measuring plane" light beam from source 84 is blocked and not reflected by specular reflector 82, hence not sensed by detector 78. Such an "Off" signal from detector 78 inhibits a bearing sample from being processed.

Figure 11:
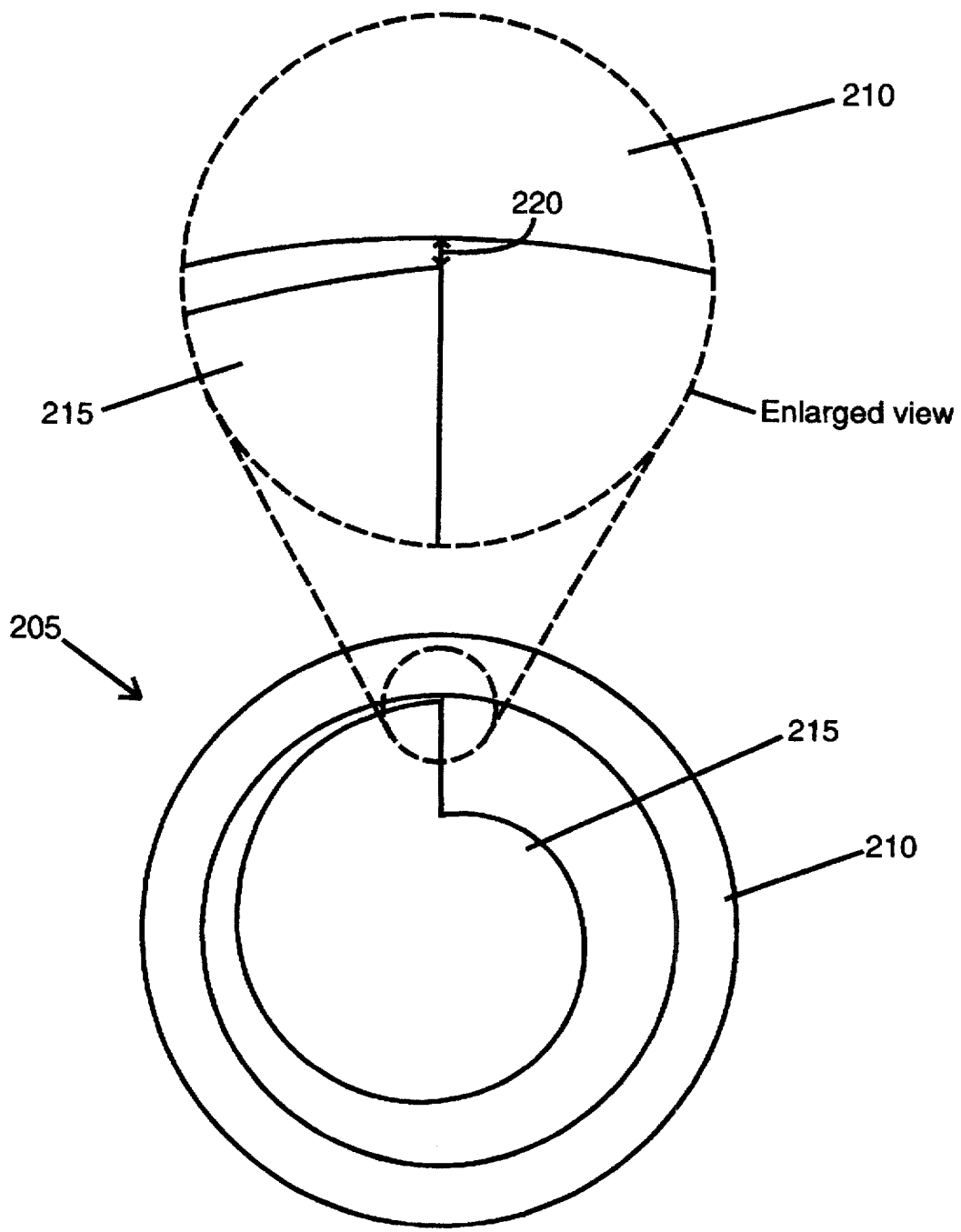
FIG. 11 is an illustration of a cam and ring assembly for two piece ouroboros construction.

FIG. 11 shows an alternate embodiment of slotted disk 108, cam segment 215 and ring segment 210 compose a slotted disk 205 equivalent to slotted disk 108. In this alternate embodiment cam segment 215 and ring segment 210 are physically separated by space 220. Cam segment 215 with magnet 100 mounted thereon, being suitably balanced such that the center of mass of cam 215 is at its geometric center, is balanced on pivot 76. As cam segment 215 tilts from the measuring plane source 84 is interrupted and a bearing sample is not processed. This embodiment is sometimes dictated to be used rather than a one piece disk, as slotted disk 108. The dimensions of space 220, vary from 0.0001 inches to 0.020 inches being dependent upon both the material used and the method of fabrication of an ouroboros disk.

Figure 12:
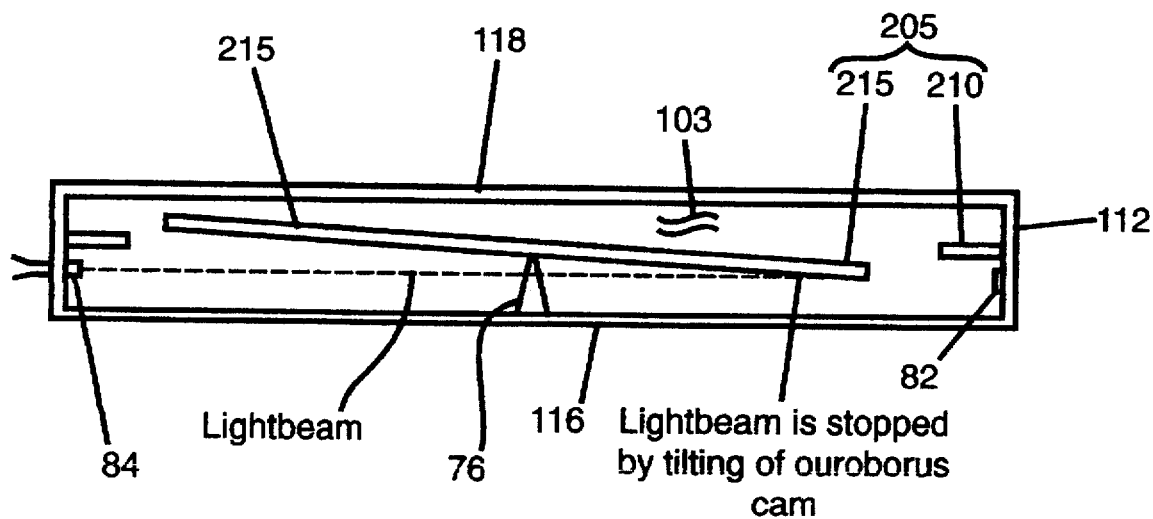
FIG. 12 is a side view cross section of laser path, reflectors and laser source detector illustrating the intersection of a slotted disk when constructed from a cam and ring assembly. The cam portion tilts into the laser path plane, hence, interrupts a bearing measurement.

FIG. 12 is a cross sectional view of cylindrical housing 132 through top element 118, wall 112 and bottom element 116. As cam 205 tilts a few degrees out of a "measuring plane" light beam from source 84 is blocked and not reflected by specular reflector 82, hence not sensed by detector 78. Ring 205 is shown as being attached to cylinder wall 112, however cylinder 112 itself may form the ring structure to yield ouroboros slot 102. Such an "Off" signal from detector 78 inhibits a bearing sample from being processed.

Figure 13:
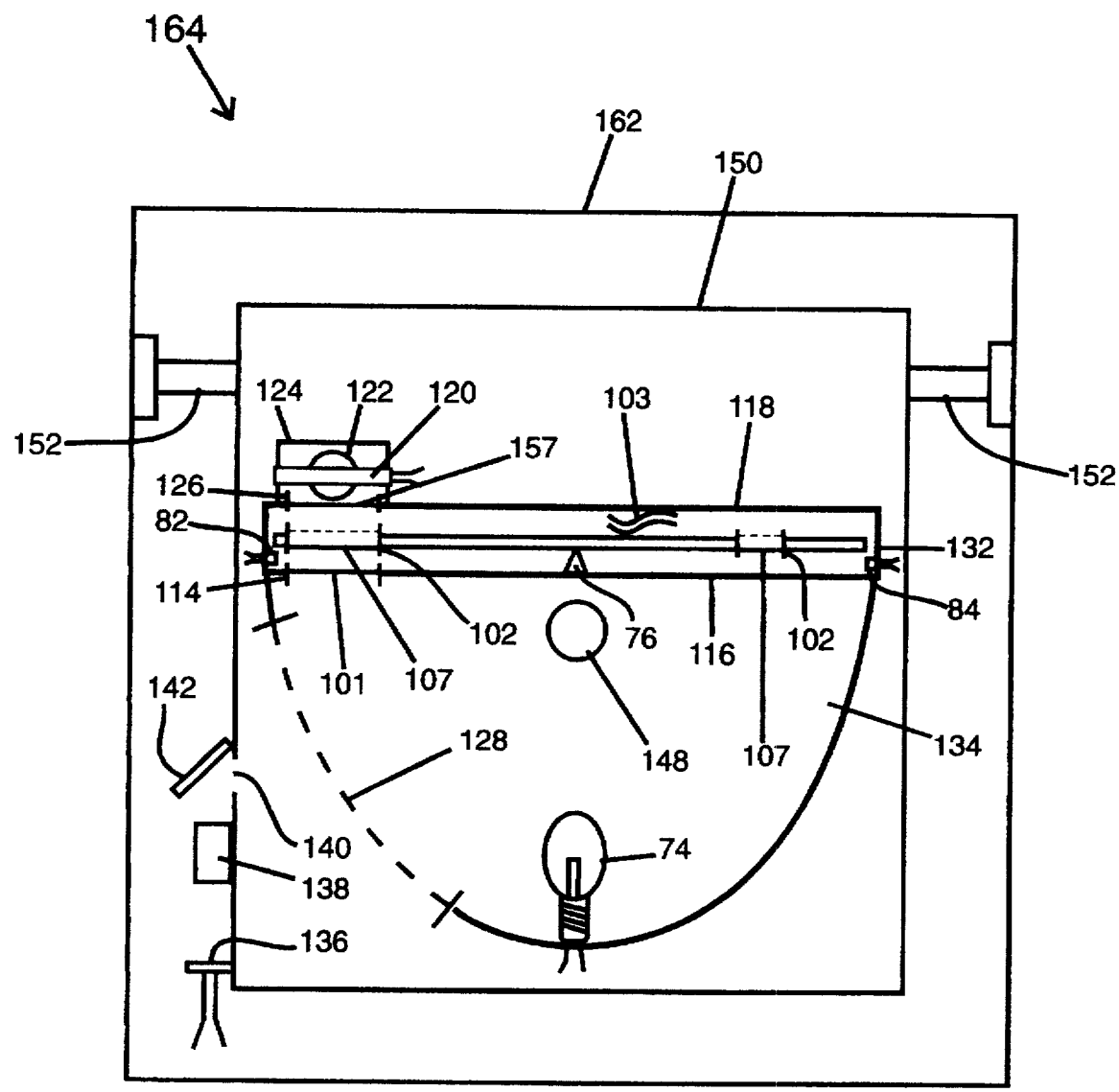
FIG. 13 is a cross section through the invention which shows the roll sensor elements.

FIG. 13 is cross sectional view through gimballed compass 164 showing the spacial relationship of the various elements comprising the invention. Third housing 162 depends from second housing 150 by gimbal means 152. Emission housing also depends from second housing 150 by gimbal means 148. Emission housing 148 contains source 74 which is isotropic. Emission source 74 simultaneously illuminates bottom aperture 114, inner triangular slot 128 and third housing emission passage 144 (shown in FIG. 1). Signals proportional to orientation of slotted disk 108 or its equivalent structure, disk 205, in an external magnetic field, orientation of emission housing 134 relative to second housing 150, and orientation of third housing 162 relative to an initial starting point are sensed by the respective detectors providing bearing, pitch and roll information to be used by the microprocessor.

Figure 14:
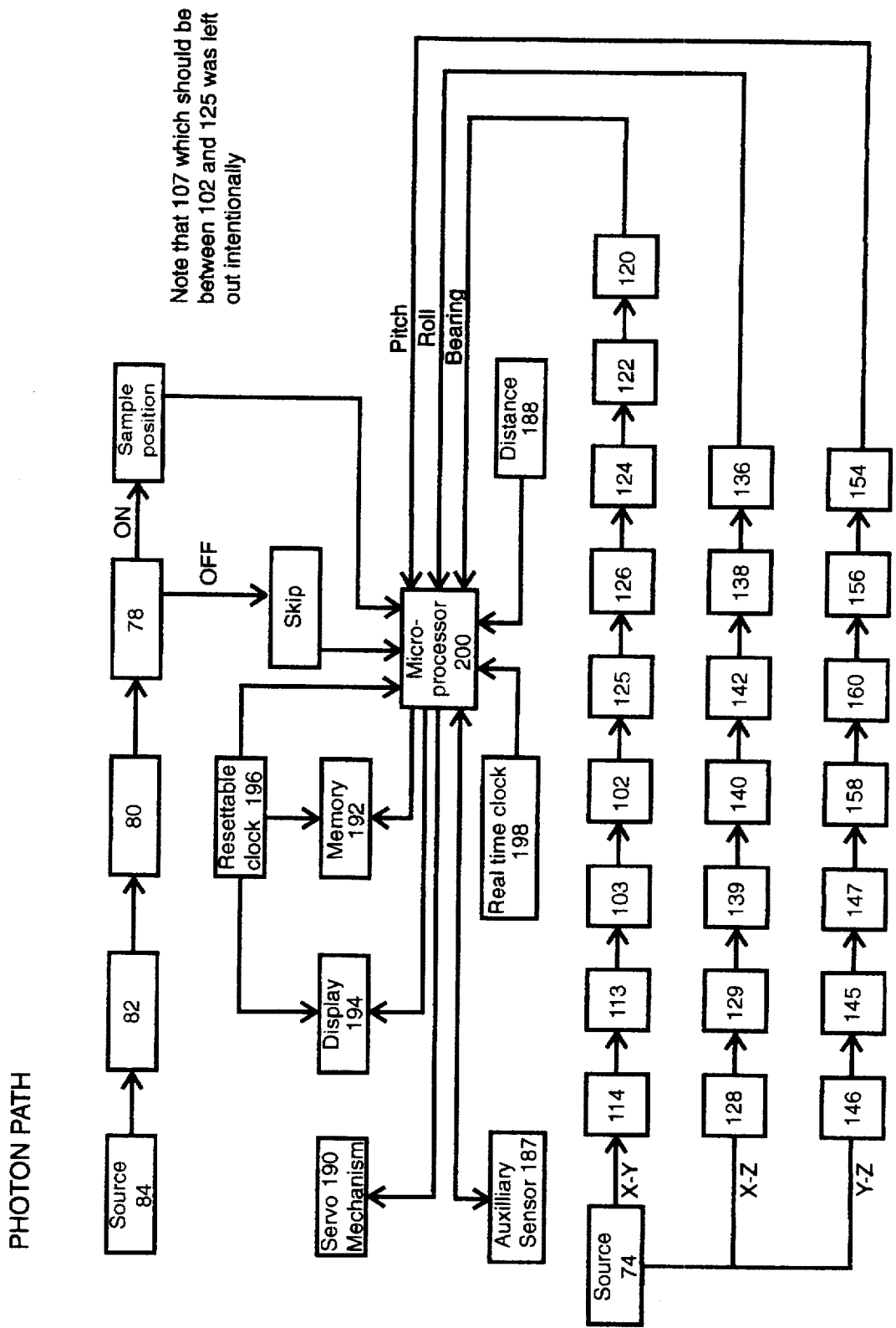
FIG. 14 is a detailed logic schematic showing the relationship between bearing and attitude sensing elements.

FIG. 14 (photon path) illustrates schematically the logic utilized in the invention to accomplish the instantaneous pitch, roll and bearing. Source 84 is reflected by specular reflectors 82 and 80 onto source detector 78 forming a plane of illumination below the measuring plane of the compass card, slotted disk 108. When source detector 78 is "On" a position sample is taken by microprocessor 200. When source detector 78 is "Off", or not illuminated by source 84, then compass card, slotted disk 108, is out of its measuring plane and microprocessor 200 skips the current position sample. Microprocessor 200 samples detector 78 many thousands of times a second. The sample rate of microprocessors is well know to be in the megahertz range, hence, rapid out of plane motion of the compass card, slotted disk 108, provide many signals per second when the compass card is in the measuring plane. The purpose of sampling bearings when in the measuring plane is to reduce the error in the bearing obtained. When the compass card is out of plane the apparent width of the ouroboros at the apertures is less than the true width representative of the angular position. The gimbal mount keeps the entire apparatus level with the horizon whilst measuring the angular displacement out of a horizontal plane (best illustrated in FIG. 16).

Microprocessor 200 receives bearing information from source detector array 120 when source detector 78 is on; receives x-z or roll information from detector array 136 when source detector 78 is on; receives y-z or pitch information from detector array 154 when source detector 78 is on. Microprocessor 200 also receives information from ancillary sources; distance measuring device or speedometer 198, auxiliary sensor 187 which may include sonar, radar, touch or contact sensors, or other sensors which are used with autonomous devices. Microprocessor 200 stores to memory 192 pitch, roll, bearing and the live-time the simultaneous positions are taken along with a time point relative to an initial setting of the resettable clock 196. Resetable clock 196 allows the user to measure the time traveled at some bearing and attitude. Microprocessor 200 is used to activate of de-activate servo-mechanism 190 according to its internal programming utilizing such in-plane pitch, roll, and bearing information derived from detector arrays 120, 136 and 154. Microprocessor 200 drives display 194, best illustrated in FIG. 17, to display for the user virtual real-time attitude information.

Figure 17:
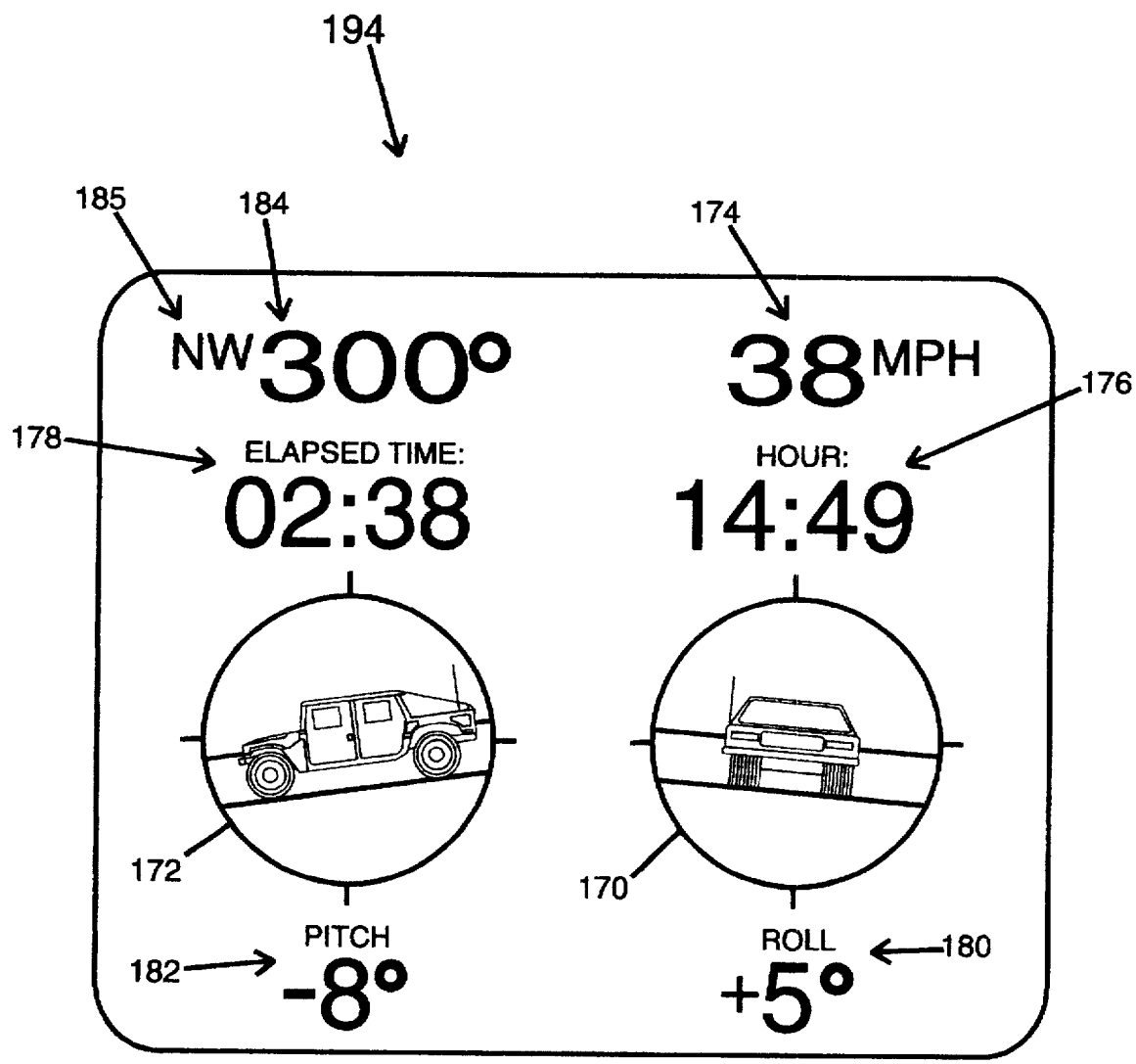
FIG. 17 is an illustration of a display output to an automobile user of the gimballed compass device.

Referring again to FIG. 14. Source 84 reflects from specular reflectors 82 and 80 onto source detector 78. When detector 78 is on microprocessor 200 receives orientation information from detector arrays 120, 136 and 154. Emission source 74 illuminates aperture 114 and passes through aperture membrane 113. Source 74 illumination passes through fluid 103 which fills the housing selected to be transparent to radiation from source 74. Emission is then attenuated by the width of ouroboros slot 102 on the compass card, slotted disk 108, according to its portion in an external magnetic field. Attenuated emission may pass through ouroboros membrane 107, when used, or directly to the top aperture membrane 125 and be attenuated by top aperture 126. Said attenuated radiation provides an instant image of aperture 126 on mirror 124 whilst beam coupler 122 presents an appropriately scaled image of aperture 126 onto linear detector array 120, nominally a CCD array. The resultant signal is a representation of the bearing of the compass card, or the position of a vehicle in the x-y plane, as best illustrated in FIG. 17.

Referring again to FIG. 14. Source 84 reflects from specular reflectors 82 and 80 onto source detector 78. When detector 78 is on microprocessor 200 receives orientation information from detector arrays 120, 136 and 154. Emission source 74 illuminates triangular slot 128 and passes through slot membrane 129. Emission then passes through aperture membrane 139 is then attenuated by second housing aperture 140 according to its position relative to triangular slot 128. An image of aperture 140 is reflected by mirror 142. Beam coupler 138 projects an appropriately scaled image from mirror 142 of aperture 140 onto detector array 136 which provides a signal to microprocessor 200 proportional to the instantaneous x-z or roll position of emission housing 134 relative to second housing 150.

Referring again to FIG. 14. Source 84 reflects from specular reflectors 82 and 80 onto source detector 78. When detector 78 is on microprocessor 200 receives orientation information from detector arrays 120, 136 and 154. Emission source 74 passes thorough emission passage 144 and membrane 145 thence passing through triangular slot 146 and passes through slot membrane 147. Emission then passes through aperture membrane 159 s then attenuated by third housing aperture 158 according to the third housings position relative to second housing triangular slot 146. An image of aperture 158 is reflected by mirror 160. Beam coupler 156 projects an appropriately scaled image from mirror 160 of aperture 158 onto detector array 154 which provides a signal to microprocessor 200 proportional to the instantaneous y-z or pitch position of third housing 162 relative to second housing 150.

Figure 15:
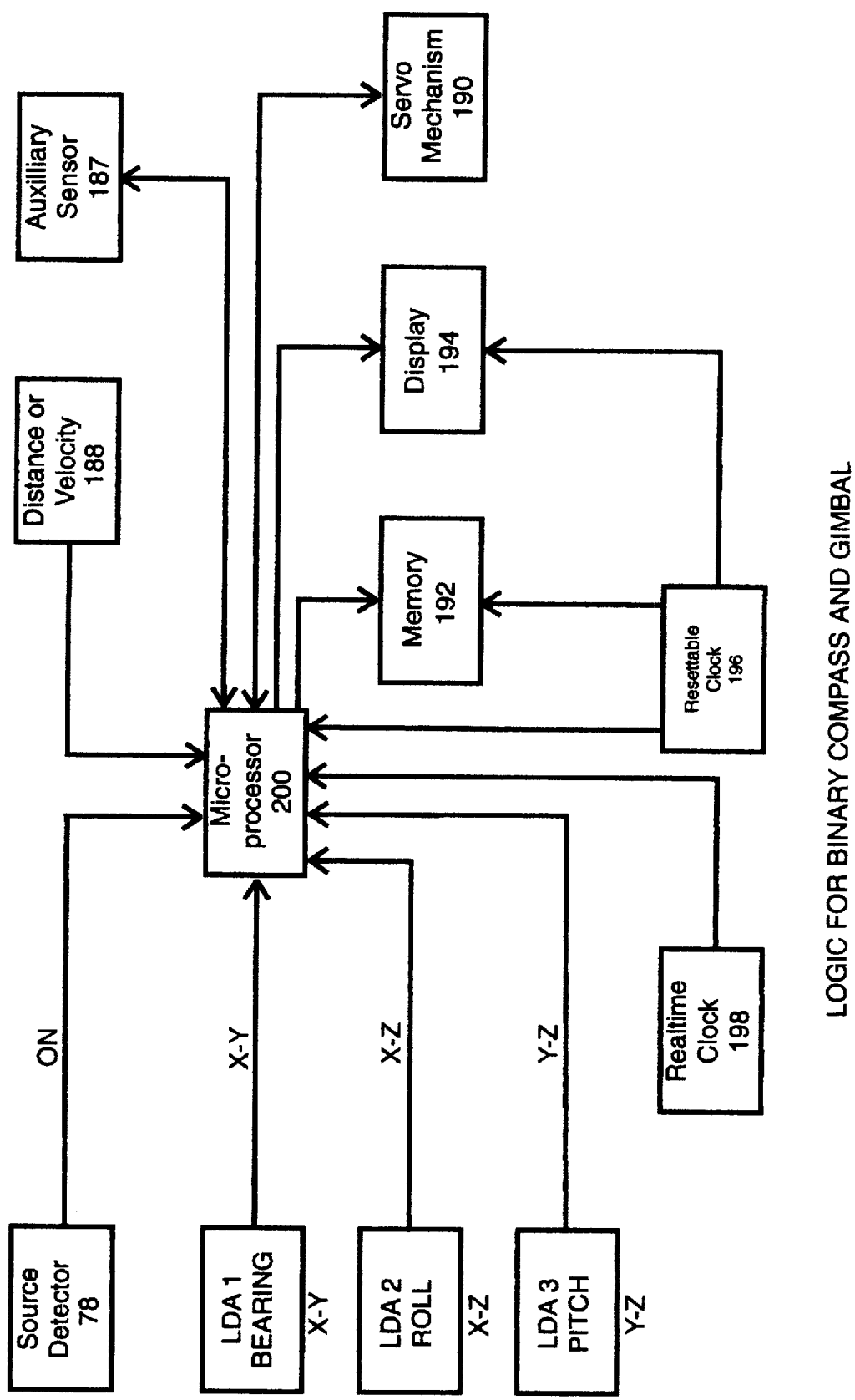
FIG. 15 is a simplified logic diagram showing the interaction of the logical components with the microprocessor to yield real-time orientation information.

FIG. 15 provides a simplified logic diagram for FIG. 14 which shows the relationships of those elements of the invention which provide information to microprocessor 200. Source "on" triggers microprocessor 200 to accept information from linear detector arrays designated LDA1 for bearing (x-y), LDA2 for roll (x-z) and LDA3 (y-z) for pitch. Ancillary information obtained from velocity or distance sensor 186, auxiliary sensor 187, and servo-mechanism 190 may be utilized independently of bearing and attitude information, hence need not be dependent upon measurements made in a measuring plane. Hence, said information may be utilized when detector 78 is in either the "on" or "off" state.

Figure 16:
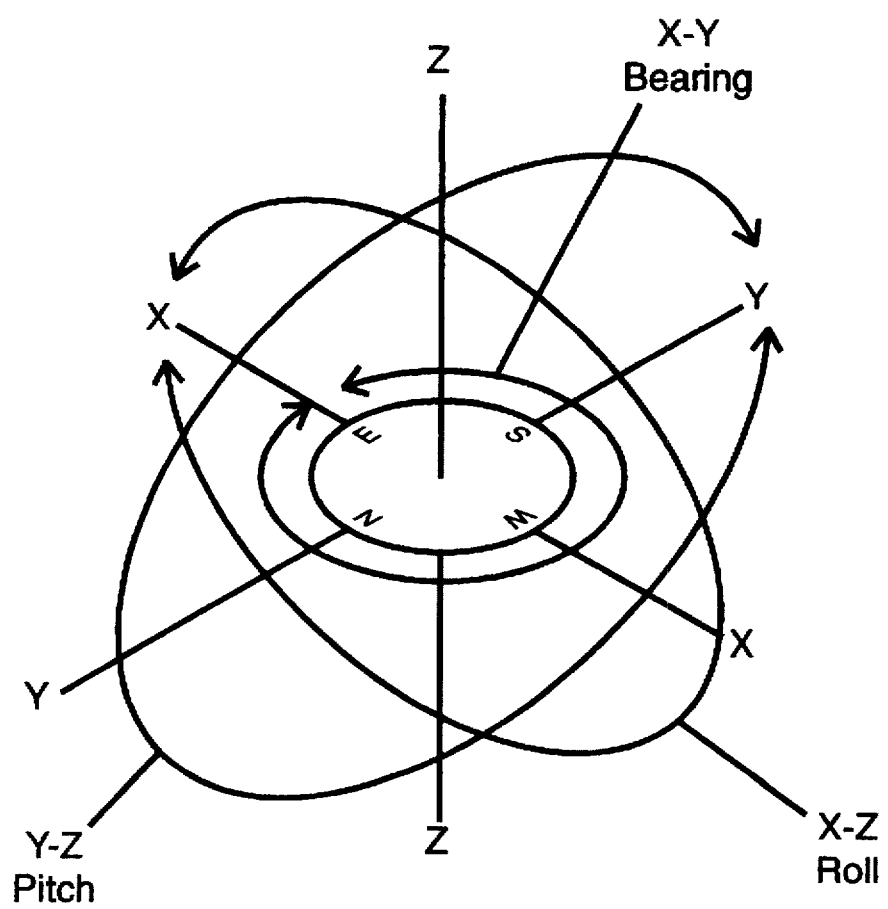
FIG. 16 is a schematic illustration to show how pitch, roll and bearing are spatially related.

FIG. 16 is to clearly illustrate the spacial orientation or attitude information obtained from the instant invention. The x-y plane is defined as bearing, the x-z plane as roll and the y-z plane as pitch.

FIG. 17 is an illustration of a type of display which is output to the user. The display provides the user with bearing 184, cardinal point related to the bearing 185, instant velocity 174 in miles per hour (mph), current clock time 176, and elapsed time 178 along a bearing or since the clock was reset to zero. The display also graphically illustrates the instantaneous pitch 172 and its numerical value in degrees 182. The display further illustrates graphically the roll 170 and its numerical value in degrees 180.

It is understood that FIG. 17 gives just one example of a possible configuration for the display face 194. Many other possible configurations for the display face 194 are possible and another may be preferred.

With the information stored and available for recall the user can sketch on paper or on a map the path traveled by employing standard dead reckoning methods. Using well known navigation methods paths so determined can be retraced within the precision of the apparatus disclosed herein. The intrinsic uncertainty and accuracy of the compass and factors which effect it's readings are well known hence not further detailed here.

A detailed parts list with reference numbers is included below as a convenience.

| Part Number | Nomenclature |
| --- | --- |
| 164 | Gimballed Compass Device |
| Third Housing | |
| 162 | third housing |
| 161 | third housing detection element |
| 160 | third housing reflector |
| 159 | third housing aperture membrane |
| 158 | third housing aperture |
| 157 | third housing aperture membrane |
| 156 | third housing beam coupling device |
| 154 | third housing or third CCD or linear detector array |
| 152 | third housing gimbal mount |
| Second Housing | |
| 150 | second housing |
| 148 | second housing gimbal mount |
| 147 | second housing triangular slot membrane |
| 146 | second housing triangular slot |
| 145 | third housing emission passage membrane |
| 144 | third housing emission passage |
| 143 | second housing detection element |
| 142 | second housing reflector |
| 140 | second housing aperture |
| 139 | second housing aperture membrane |
| 138 | second housing beam coupling device |
| 136 | second housing or second CCD or linear detector array |
| First Housing | |
| 134 | emission housing |
| 132 | cylindrical chamber |
| 130 | first housing |
| 129 | first housing triangular slot membrane |
| 128 | first housing triangular slot |
| 127 | first housing detection element |
| 126 | top aperture |
| 125 | top aperture membrane |
| 124 | inner reflector |
| 122 | inner beam coupling device |
| 120 | inner or first CCD or linear detector array |
| 118 | top aperture plate |
| 116 | bottom aperture plate |
| 114 | bottom aperture |
| 113 | bottom aperture membrane |
| 112 | cylinder wall or side element of cylindrical chamber |
| 108 | slotted disk or compass card |
| 107 | ouroboros slot membrane |
| 106 | minimum ouroboros slot width |
| 104 | maximum ouroboros slot width |
| 103 | fluid in compass chamber |
| 102 | ouroboros slot |
| 100 | magnet |
| 98 | magnetic's north pole |
| 96 | magnetic's south pole |
| 94 | center of slotted disk |
| 92 | circumference of slotted disk |
| Detection element | |
| 90 | detector module |
| 89 | generic linear array of detectors or CCD device |
| 88 | generic beam coupling device - lenses, mirrors, prisms, fiber optic cable |
| 87 | generic aperture slit |
| 86 | generic reflector device |
| Out of plane detector | |
| 84 | laser or collimated emission source |
| 82 | first measuring plane reflector |
| 80 | second measuring plane reflector |
| 78 | laser source detector for measuring plane |
| 76 | slotted disk pivot mount |
| 74 | emission source |
| Line of light DWGS | |
| WL1 | width of ouroboros under top aperture |
| L1 | line of light corresponding to WL1 |
| RL1 | length of line of light reflected to beam coupler device |
| DL1 | Length of line of light focused on detector |
| WL2 | width of ouroboros under top aperture |
| L2 | line of light corresponding to WL2 |
| RL2 | length of line of light reflected to beam coupler device |
| DL2 | Length of line of light focused on detector |

-continued

| Part Number | Nomenclature |
| --- | --- |
| Cam and Ring Embodiment | |
| 205 | cam and ring structure |
| 210 | ring segment |
| 215 | cam segment or compass card alternate embodiment |
| 220 | minimum space between cam and ring structure |
| Logic | |
| 200 | Microprocessor |
| 198 | Real Time Clock |
| 196 | Resettable Clock |
| 194 | Display |
| 192 | Memory |
| 190 | Servo-mechanism |
| 188 | Distance or velocity input |
| 187 | Auxiliary sensor input |
| Display | |
| 194 | Display |
| 184 | Bearing |
| 185 | cardinal point related to bearing |
| 182 | Pitch |
| 180 | Roll |
| 178 | Elapsed Time |
| 176 | Clock Time |
| 174 | Velocity |
| 172 | Attitude Graphic - pitch |
| 170 | Attitude Graphic - roll |

It is apparent from the above that the present invention accomplishes all of the objectives set forth by providing a new and improved, low cost, orientation device with a digital output, which is sensitive to an external magnetic field, the device having simple circuitry and logic.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. A navigational device for determining the directional orientation with respect to an external magnetic field and attitude orientation with respect to a horizon, said device comprising:

a first housing, said first housing nested within a second housing, said second housing further nested within a third housing, said first housing connected to said second housing by a first gimbal means, wherein said first housing is freely tiltable within said second housing, said second housing connected to said third housing by a second gimbal means, wherein said second housing is freely tiltable within said third housing, said first housing further having a lower chamber, said lower chamber being generally half spherical, including a top panel and arcuate side panels, said lower chamber further having an interior, said lower chamber further including an emitting means, said emitting means located in said interior, said emitting means having an emission, said emission having a first intensity, an upper chamber, said upper chamber located atop said lower chamber, a freely rotatable disk, said disk mounted in said upper chamber by a mounting means, said disk intermediate said emitting means and a first detecting device, said disk further having a magnet mounted thereon, said disk having a position relative to an external magnetic field, said disk being generally circular with a center and a circumference, said disk including a first slot, said first slot proximal to the circumference and defining a first passage, said first passage having a first width, said first width varying linearly about the circumference, wherein said first passage permits a first portion of said emission to propagate therethrough, said first portion having a second intensity, said second intensity detected by said first detecting means, said lower chamber further having a second slot passing through said arcuate side panel, said second slot being an elongated triangle of continuously variable width, said second slot defining a second passage, said second passage permits a second portion of said emission to propagate therethrough, said second portion having a third intensity, said third intensity being detected by a second detecting means, said lower chamber also including a first cutout on said arcuate side panel, said first cutout permitting said emission to pass therethrough, said second housing being generally cylindrical further including a sidewall, said second housing having a third slot on said sidewall, said third slot being an elongated triangle of continuously varying width, said third slot defining a third passage, said third passage permits a third portion of said emission to propagate therethrough, said third portion having a fourth intensity, said fourth intensity being detected by a third detecting means, whereby said first detecting means provides a first signal directly proportional to the bearing of said navigational device, and said second detecting means provides a second signal directly proportional to the roll of said navigational device, and said third detecting means provides a third signal directly proportional to the pitch of said navigational device.

2. A navigational device as claimed in claim 1 where intermediate said first detecting means and said first slot is a first reflection means and a first emission focussing means, wherein said first reflection means reflects said second intensity into said first emission focussing means, and said first emission focussing means focusses said second intensity onto said first detecting means.

3. A navigational device as claimed in claim 2 where intermediate said second detecting means and said second slot is a second reflection means and a second emission focussing means, wherein said second reflection means reflects said third intensity into said second emission focussing means, and said second emission focussing means focusses said third intensity onto the second detecting means.

4. A navigation device as claimed in claim 3 where intermediate said third detecting means and said third slot is a third reflection means and a third emission focussing means, wherein said third reflection means reflects said fourth intensity into said third emission focussing means, and said third emission focussing means focusses said fourth intensity onto the third detecting means.

5. A navigation device as claimed in claim 4 wherein said first detecting means, said second detecting means and said third detecting means are charged couple devices (CCD).

6. A navigation device as claimed in claim 5 wherein said first emission focussing means, second emission focussing means and said third emission focussing means are selected from the group consisting of fiber optics, lenses, and prisms.

7. A navigational device for determining roll, pitch and direction of an object in space comprising:

an emission means, said emission means producing an emission having a first intensity, a first emission variable attenuation means and a first detection means, said first emission variable attenuation means intermediate said first detection means and said first intensity, said first intensity being attenuated by said first emission variable attenuation means leaving a second intensity, said second intensity being detected by said first detection means, a second emission variable attenuation means and a second detection means, said second emission variable attenuation means intermediate said second detection means and said first intensity said first intensity being attenuated by said second emission variable attenuation means leaving a third intensity, said third intensity being detected by said second detection means, a third emission variable attenuation means and a third detection means, said third emission variable attenuation means intermediate said third detection means and said first intensity said first intensity being attenuated by said third emission variable attenuation means leaving a fourth intensity, said fourth intensity being detected by said third detection means, whereby said first detecting means provides a first signal proportional to the direction of said navigational device, and said second detecting means provides a second signal proportional to the roll of said navigational device, and said third detecting means provides a third signal proportional to the pitch of said navigational device.

8. A navigational device as claimed in claim 7 where intermediate said first detection means and said first emission variable attenuation means is a first reflection means and a first emission focussing means, wherein said first reflection means reflects said second intensity into said first emission focussing means, and said first emission focussing means focusses said second intensity onto said first detection means.

9. A navigational device as claimed in claim 8 where intermediate said second detection means and said second emission variable attenuation means is a second reflection means and a second emission focussing means, wherein said second reflection means reflects said third intensity into said second emission focussing means, and said second emission focussing means focusses said third intensity onto the second detection means.

10. A navigational device as claimed in claim 9 where intermediate said third detection means and said third emission variable attenuation means is a third reflection means and a third emission focussing means, wherein said third reflection means reflects said fourth intensity into said third emission focussing means, and said third emission focussing means focusses said fourth intensity onto the third detecting means.

11. A navigational device as claimed in claim 10 wherein said first detecting means, said second detecting means and said third detecting means are charged couple devices (CCD).

12. A navigational device as claimed in claim 11 wherein said first emission focussing means, second emission focussing means and said third emission focussing means are selected from the group consisting of fiber optics, lenses, and prisms.

13. A navigational device as claimed in claim 12 wherein said first emission variable attenuation means includes a freely rotatable, generally circular disk with a slot, said slot located about the circumference of said circular disk, said slot having a first width, said first width having a maximum dimension and a minimum dimension, said first width continuously decreasing in size from the maximum dimension to the minimum dimension.

14. A navigational device as claimed in claim 13 wherein said disk has a magnet mounted thereon.

15. A navigational device as claimed in claim 14 wherein said second emission variable attenuation means includes a freely tiltable, gimbal mounted, first housing, said first housing having a wall including a first elongated triangular aperture, said triangular aperture having a second width, said second width having a maximum dimension and a minimum dimension, said second width continuously decreasing in size from the maximum dimension to the minimum direction.

16. A navigational device as claimed in claim 15 wherein said third emission variable attenuation means includes a freely tiltable, gimbal mounted, second housing, said second housing having said first housing nested within, said second housing having a wall including a second elongated triangular aperture, said second triangular aperture having a third width, said third width having a maximum dimension and a minimum dimension, said third width decreasing in size from the maximum dimension to the minimum dimension.

* * * * *